United States Patent [19]

Shekleton

[11] 4,373,325
[45] Feb. 15, 1983

[54] COMBUSTORS

[75] Inventor: Jack R. Shekleton, San Diego, Calif.

[73] Assignee: International Harvester Company, Chicago, Ill.

[21] Appl. No.: 128,360

[22] Filed: Mar. 7, 1980

[51] Int. Cl.³ .......................... F23R 3/14; F23R 3/30
[52] U.S. Cl. .................................. 60/39.06; 60/737; 60/748
[58] Field of Search ..................... 60/748, 737, 39.06; 239/404, 405, 406

[56] References Cited

U.S. PATENT DOCUMENTS

| 2,560,074 | 7/1951 | Bloomer . |
| 2,560,078 | 7/1951 | Bloomer . |
| 2,806,517 | 9/1957 | Te Nuyl . |
| 3,030,773 | 4/1962 | Johnson . |
| 3,067,582 | 12/1962 | Schirmer . |
| 3,227,202 | 1/1966 | Morgan . |
| 3,430,443 | 3/1969 | Richardson et al. . |
| 3,630,024 | 12/1971 | Hopkins . |
| 3,675,419 | 7/1972 | Lewis . |
| 3,703,259 | 11/1972 | Sturgess et al. . |
| 3,811,278 | 5/1974 | Taylor et al. . |
| 3,852,020 | 12/1974 | Peczeli et al. . |
| 3,866,413 | 2/1975 | Sturgess . |
| 3,912,164 | 10/1975 | Lefebvre et al. . |
| 3,917,173 | 11/1975 | Singh . |
| 3,937,011 | 2/1976 | Carvel et al. . |
| 4,006,589 | 2/1977 | Schirmer . |
| 4,023,351 | 5/1977 | Beyler et al. . |
| 4,054,028 | 10/1977 | Kawaguchi . |
| 4,160,640 | 7/1979 | Maev et al. . |
| 4,168,803 | 9/1979 | Simmons et al. . |
| 4,265,615 | 5/1981 | Lohmann et al. .................... 60/748 |

OTHER PUBLICATIONS

McKnight, "Development of a Compact Gas Turbine Combustor", Transactions of ASME, Apr. 9-13, 1978.
Sood et al., "Ongoing Development of a Low Emission Industrial Combustion Chamber", ASME Gas Turb. Conf., San Diego, Calif., Mar. 12-15, 1979.

Primary Examiner—Robert E. Garrett
Attorney, Agent, or Firm—Le Blanc, Nolan, Shur & Nies

[57] ABSTRACT

Combustors utilizable in a variety of sizes, configurations, and applications in which vortex induced centrifugal forces and hot gas recirculation are employed for flame stabilization. Both gas and liquid fuels can be burned, and low emission as well as other modes of operation are available.

53 Claims, 14 Drawing Figures

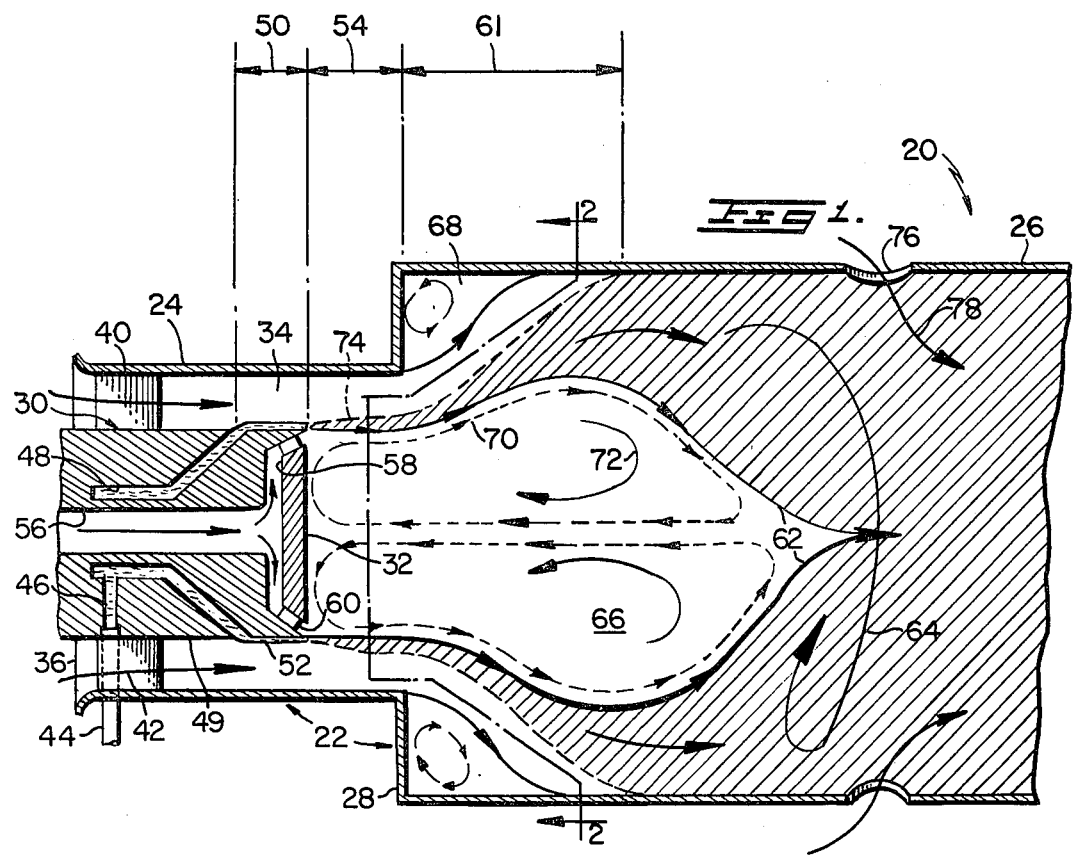
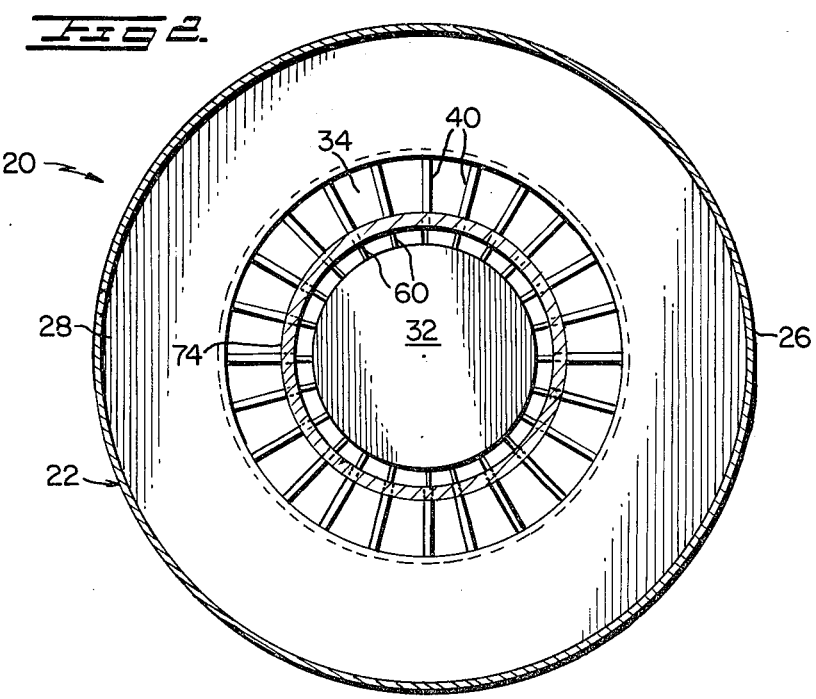

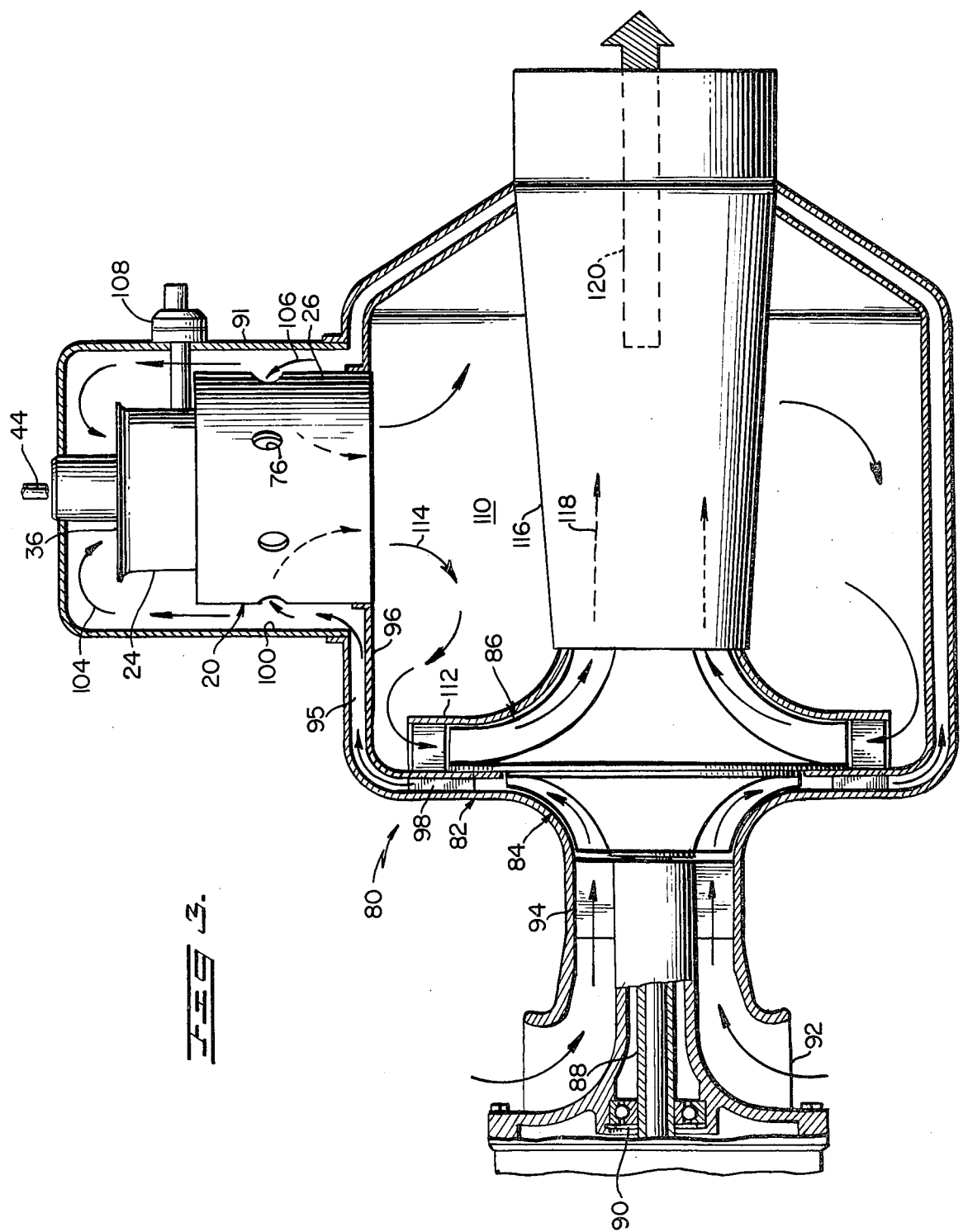

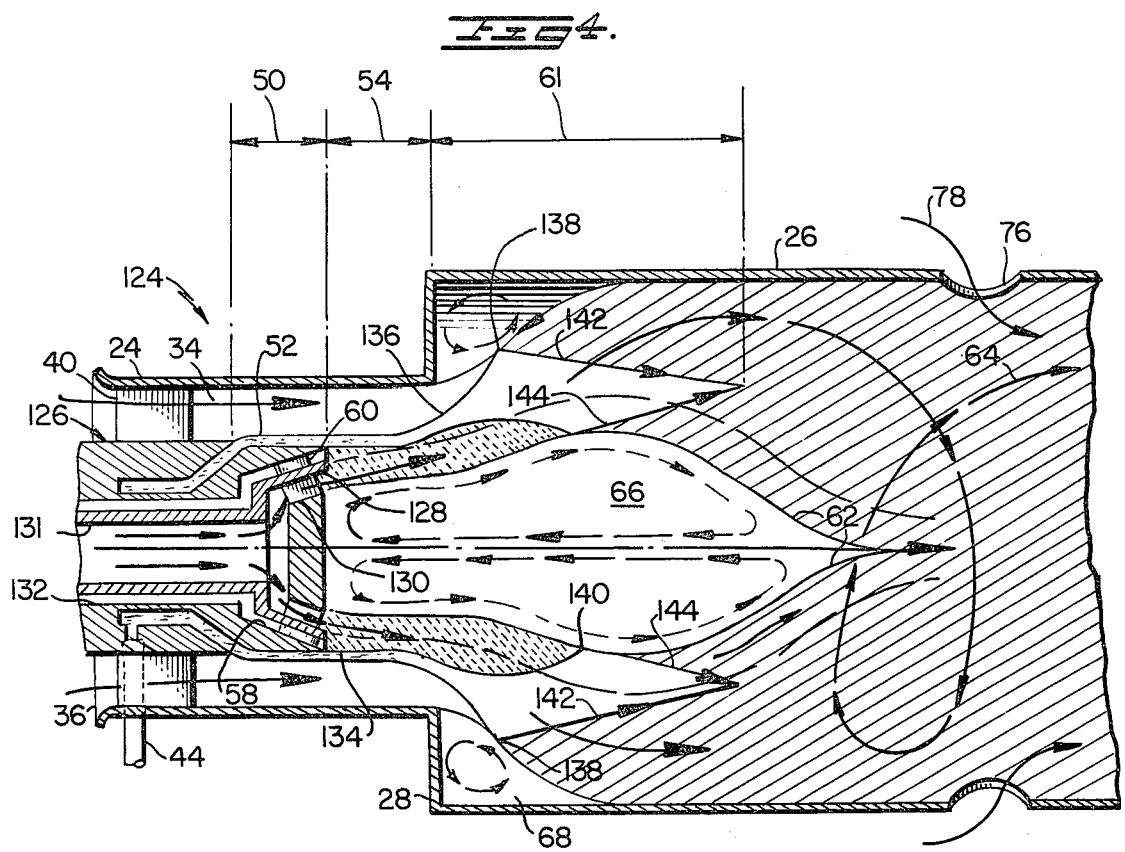
_Fig. 4._
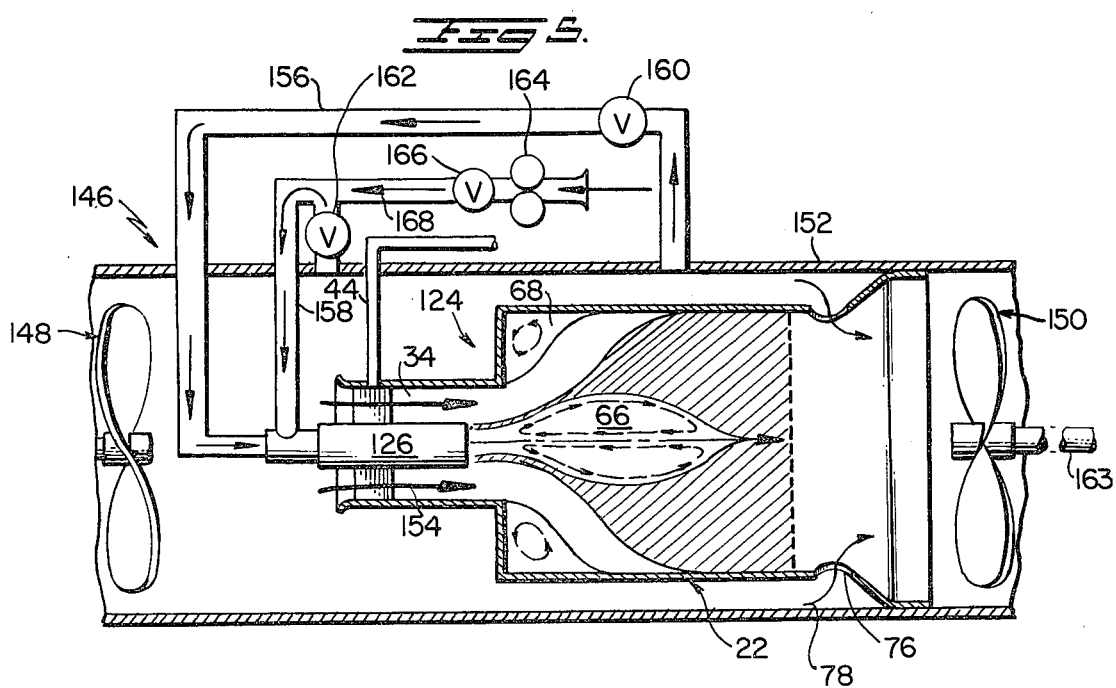
_Fig. 5._

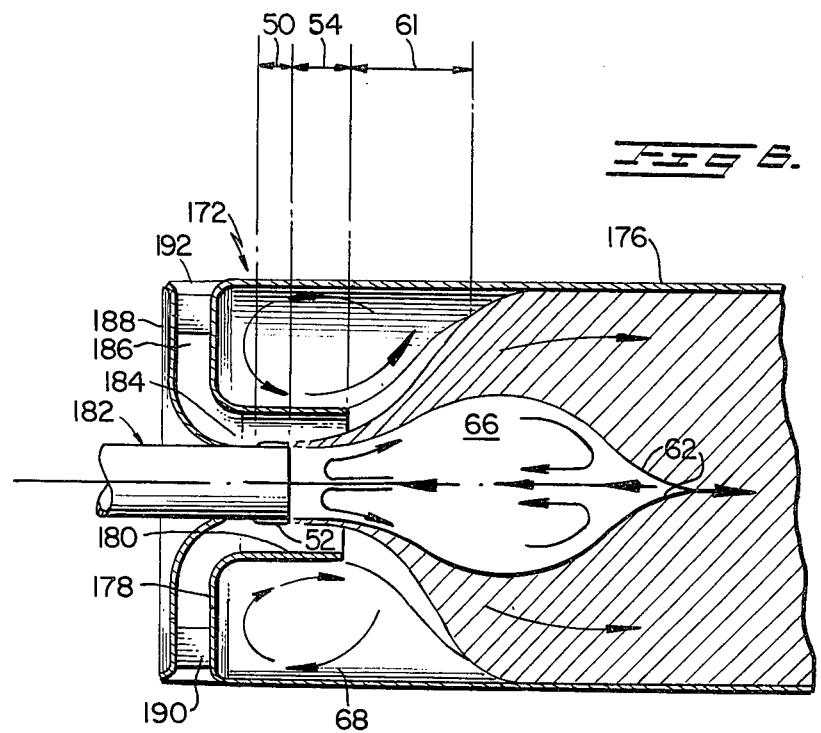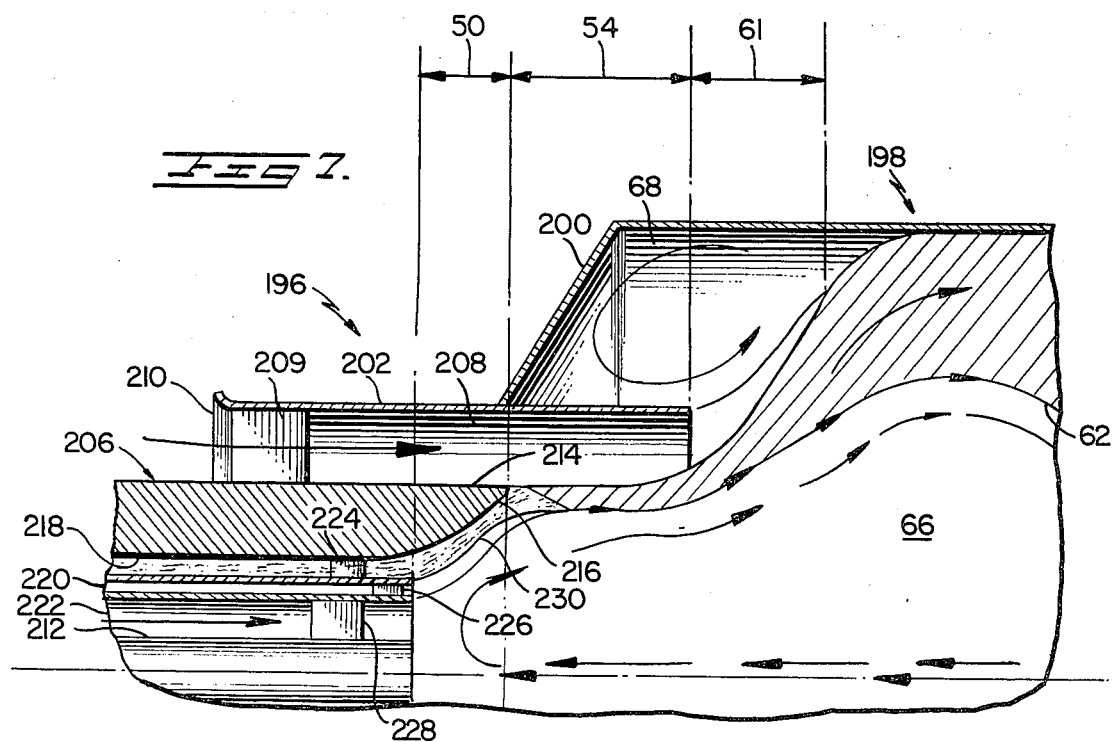

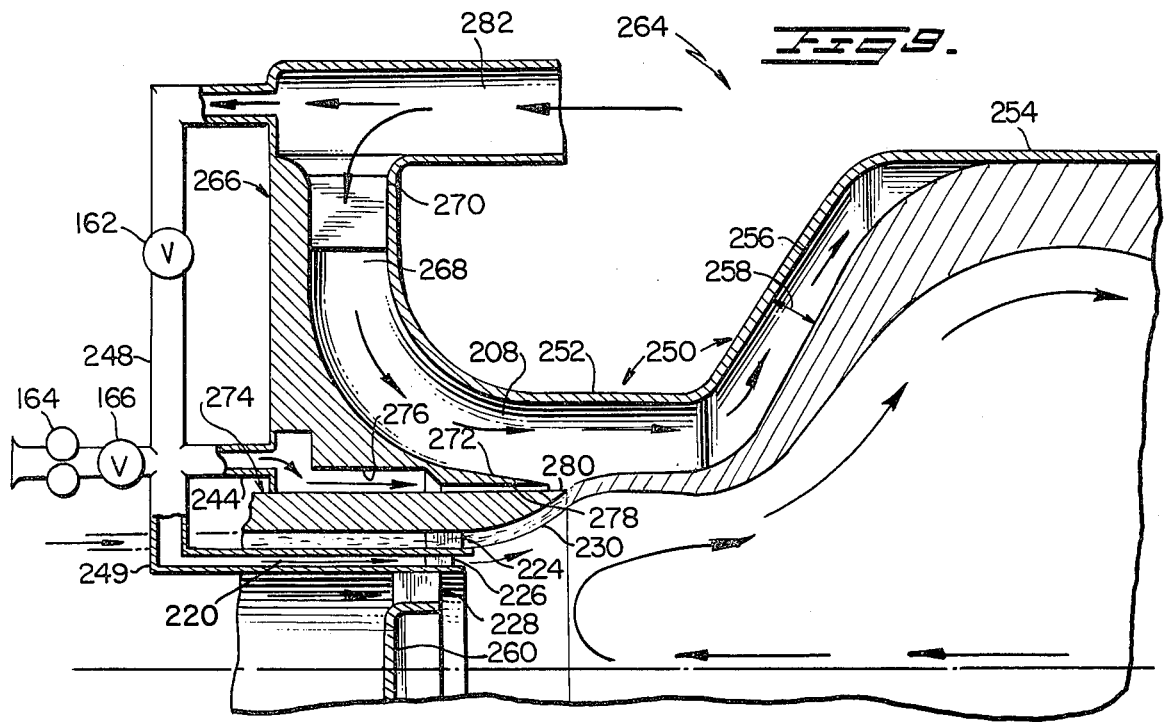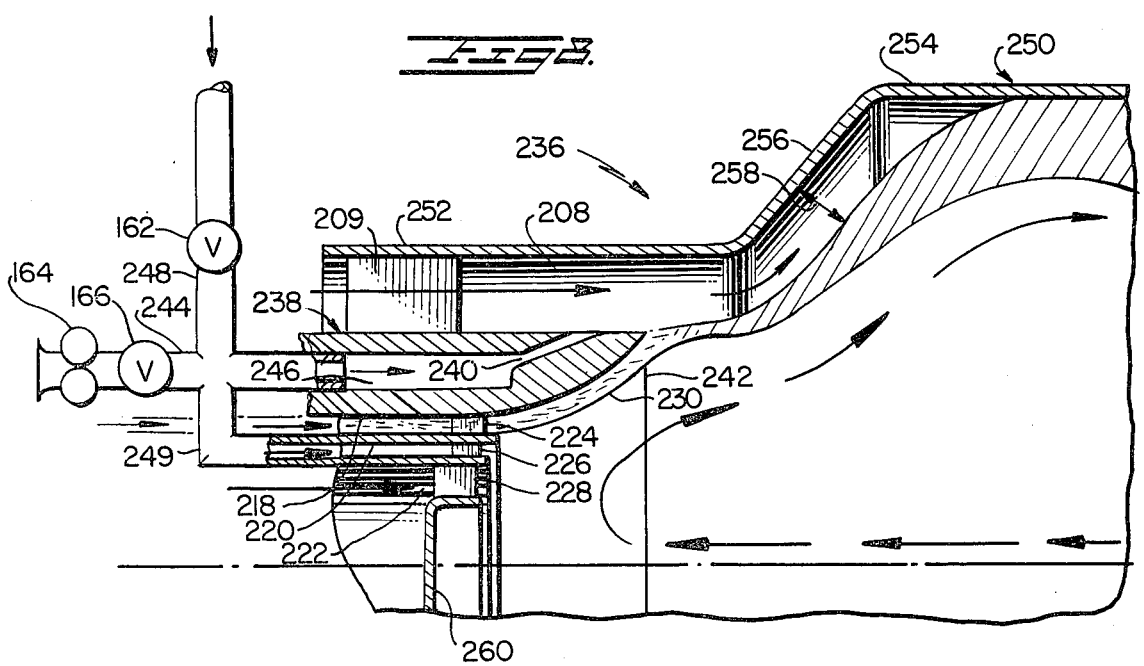

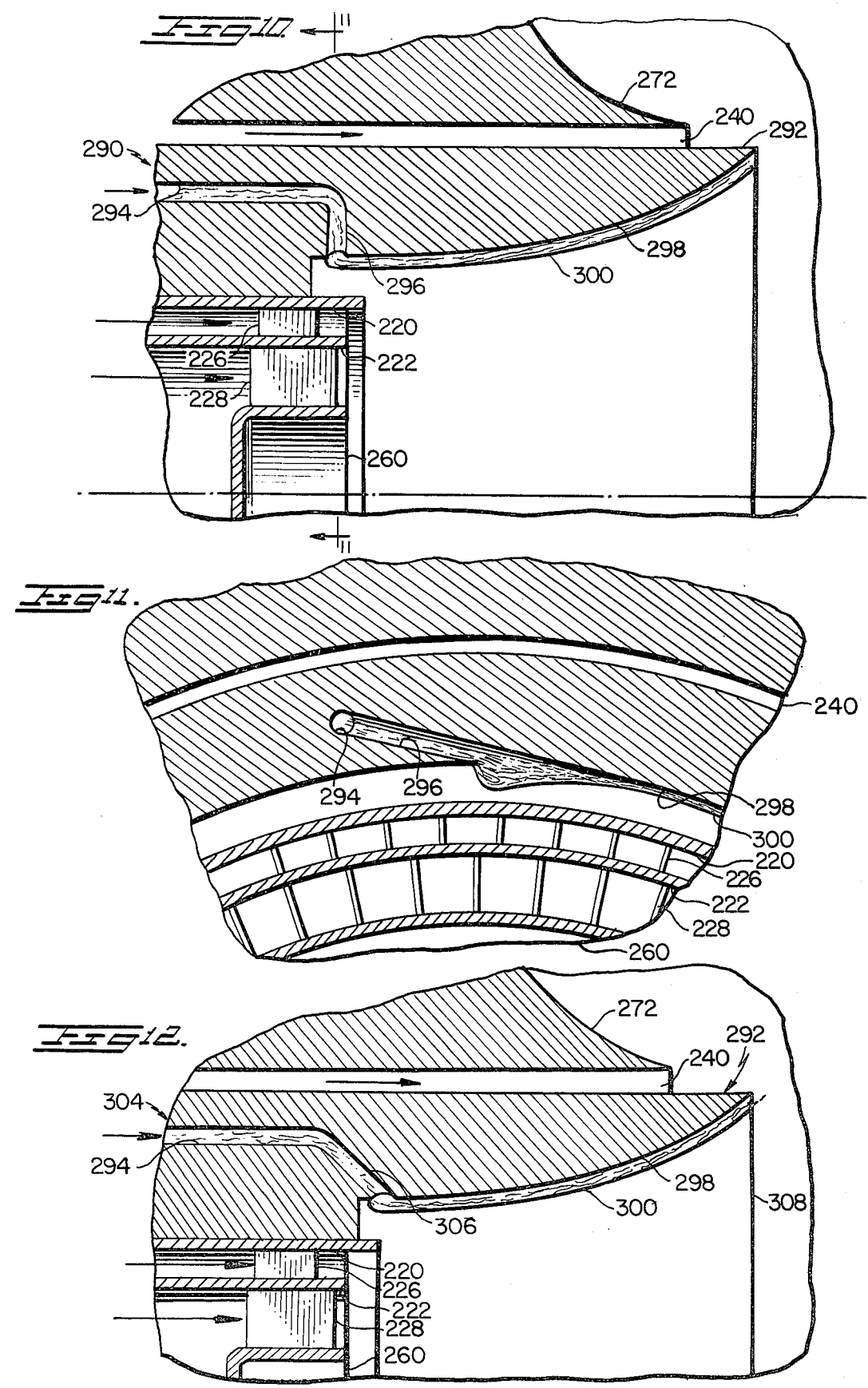

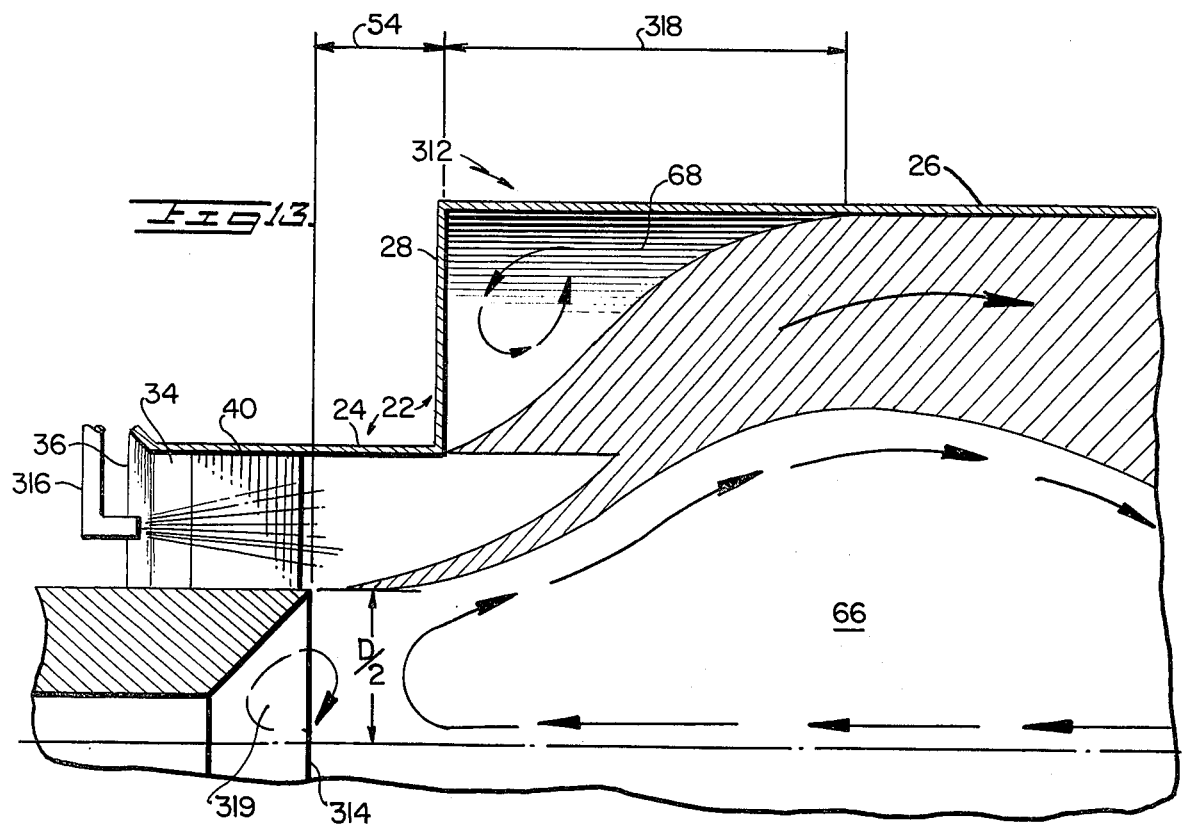
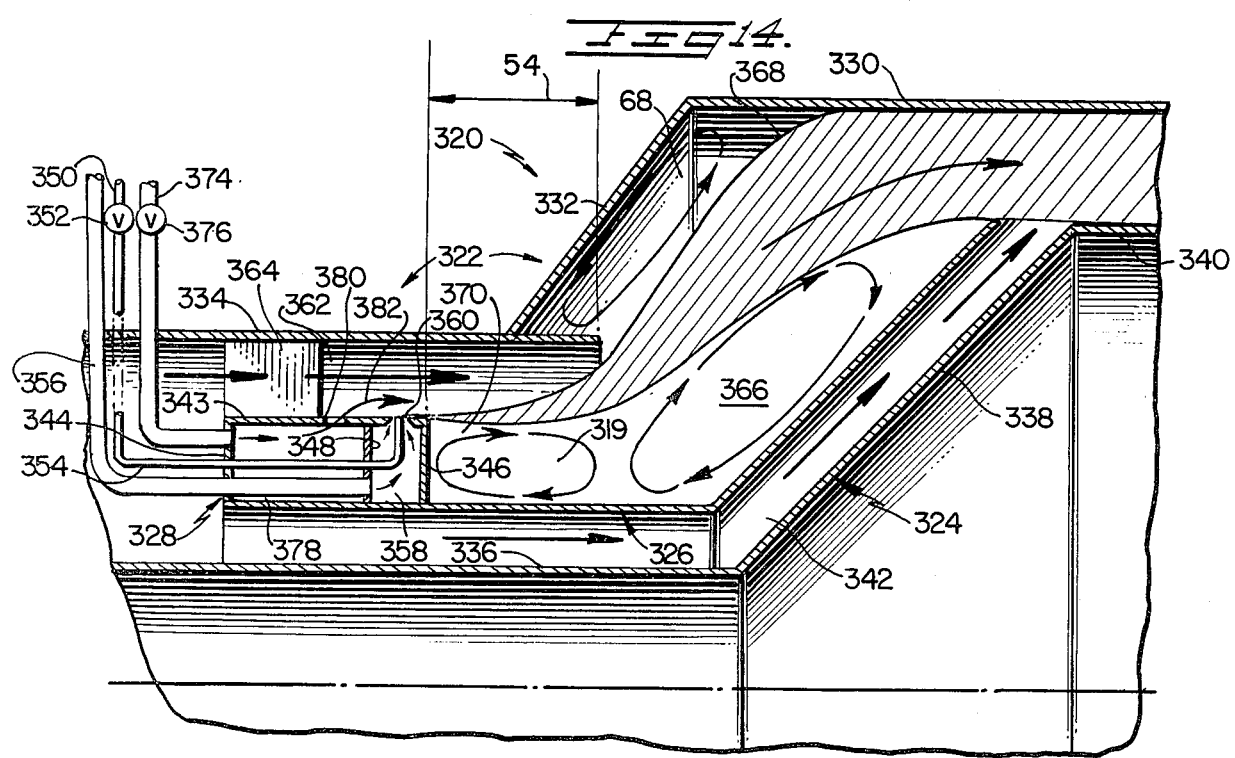

COMBUSTORS

The present invention relates to novel, improved combustors which employ swirl flame stabilization but have a number of important advantages over heretofore disclosed combustors making use of that technique.

At present, the most important applications of my invention are thought to be in the gas turbine field; and the principles of that invention will accordingly be developed primarily by reference to such applications. This is for the sake of convenience, however, and is not intended to limit the scope of the appended claims as my invention can also be employed to advantage in furnace and other combustors.

For the sake of convenience the term "CIVIC" (vortex (or swirl) induced combustion) will be used to distinguish my novel combustors from those of the prior art which includes the following, exemplary U.S. Patents:

| U.S. Pat. Nos. | Patentee(s) | Issue Date |
| --- | --- | --- |
| 2,090,568 | R. F. Andler | 8/17/37 |
| 2,284,906 | W. B. Kerrick | 6/02/42 |
| 2,560,078 | W. J. Bloomer | 7/10/51 |
| 2,806,517 | J. A. TeNuyl | 9/17/57 |
| 2,986,206 | A. R. Boelsma | 5/30/61 |
| 3,007,310 | K. Eisele | 11/07/61 |
| 3,030,773 | R. H. Johnson | 4/24/62 |
| 3,067,582 | R. M. Schirmer | 12/11/62 |
| 3,121,996 | J. Smith | 2/25/64 |
| 3,227,202 | L. J. Morgan | 1/04/66 |
| 3,430,443 | L. F. Richardson et al | 3/04/69 |
| 3,498,055 | J. J. Faitani et al | 3/03/70 |
| 3,630,024 | E. P. Hopkins | 12/28/71 |
| 3,675,419 | G. D. Lewis | 7/11/72 |
| 3,703,259 | G. J. Sturgess et al | 11/21/72 |
| 3,808,802 | Y. Tanasawa | 5/07/74 |
| 3,866,413 | G. J. Sturgess | 2/18/75 |
| 3,872,664 | R. P. Lohmann et al | 3/25/75 |
| 3,912,164 | A. H. Lefebvre et al | 10/14/75 |
| 3,937,008 | S. J. Markowski et al | 2/10/76 |
| 4,006,589 | R. M. Schirmer | 2/08/77 |
| 4,007,002 | R. M. Schirmer | 2/08/77 |
| 4,023,921 | D. Anson | 5/17/77 |
| 4,054,028 | K. Kawaguchi | 10/18/77 |

The mode of operation that perhaps best illustrates the unique features and capabilities of CIVIC combustors employs "stratified charge" injection of a liquid fuel. The expression stratified charge, commonly used indiscriminately to describe fuel injection into air in reciprocating engines, very accurately describes the stable fuel-air strata which is unique to this invention and is of fundamental importance to it.

In this mode a thin, uniform film of fuel is formed at a very precise location exactly on the inner boundary of an axially moving annulus of combustion air which has theretofore been caused to swirl or rotate about the axis of the annulus. Downstream of the zone in which this stratified film of fuel is formed, the fuel is atomized by the high velocity combustion air acting on one side of the fuel film and aided, as necessary, by a substantially smaller, subordinate stream of air directed at high velocity into contact with the other, or inner, side of the fuel film.

Very precise location of the atomized fuel droplets in relation to these air streams and to gases swirling within the combustor is of utmost importance in assuring proper functioning of the combustor. Mislocation of the fuel by as little as ca. 0.03 inch radially outward into the combustion airstream results in a serious deterioration in flame stability. Mislocation of the fuel by the same distance radially inward directs the fuel into the recirculating combustion products, resulting in excessive smoke and luminosity. Lack of precision in the location of the atomized fuel droplets, typical in conventional practice, is responsible for significant defects in combustion.

To achieve precision in location, the centrifugal forces acting on the fuel droplets must often be inhibited to assure ignition before the fuel droplets centrifuge radially outward. Yet, after ignition, the presence of centrifugal force is a prerequisite to fuel-air stratification.

As the stratified fuel-air charge moves toward the downstream end of the combustor, the atomized fuel is ignited by recirculating combustion products; and a small part of the fuel burns, vaporizing the rest of the fuel and forming a thin, stratified annulus of hot vaporized fuel adjacent to, and rotating with, the swirling annulus of combustion air. The centrifugal force of the swirling flow inhibits mixing of the hot vaporized fuel with the cooler combustion air, a most important feature of my invention.

Subsequently, the annulus of combustion air undergoes a rapid outward expansion. This drastically reduces the centrifugal force of the swirl flow, producing rapid fuel-air mixing and efficient combustion of the fuel with a short flame.

Further downstream, the swirling gases contract inwardly naturally or by mechanical constraint, and the flow annulus disappears; but the swirling flow of the gases continues. This, following the initial, outward expansion of the gases, generates inner and outer recirculation zones in which hot gases travel upstream and ignite the fuel-air mixture. A superficially similar ignition heretofore employed in gas turbine engines is highly deficient because of extraneous jets of air (this is the so-called "jet stirred" recirculation stabilization technique) and improper location of the fuel.

Initial, necessarily earlier than conventional, ignition is provided by the hot gases in the inner recirculation zone; they also furnish the main flame stabilizing mechanism. The gases recirculating in this zone have a forced vortex pattern and consequently have only a small radial force component. This is important in that the gases consequently do not disturb the wanted stratification between the cool swirl air (generally of the free vortex sort) and the hot vaporized fuel until the combustion zone is reached.

One important advantage of the present invention as just described over conventional gas turbine combustors with their jet stirred recirculation is a much superior flame, especially when the combustor is fueled by a liquid. The flame is shorter, more stable and cooler, and typically nonluminous and without smoke. In fact, it resembles the pale blue flame heretofore generally obtained only by burning a gaseous fuel. This is important because it results in much cooler combustor walls.

The lack of the aforementioned, thin stratified annulus of hot vaporized fuel results in a luminous smoky flame in heretofore proposed combustors. The smoke contaminates heat transfer surfaces and thus lowers the efficiency of heat transfer.

Stratified charge operation as just described is also advantageous in that it can be employed in off-design conditions such as light-off where premix and other fuel injection schemes are in some cases not practical because of inefficiency and lean flameout, for example.

Minimization of hot spots in the combustion zone is also an important attribute of CIVIC combustors. It is well-known that high $NO_x$ emissions can result if such hot spots exist even if the overall reaction temperature is kept low.

It is not essential that stratified charge fuel injection be employed in a CIVIC combustor. Premix fuel injection can also be employed, for example.

Other important advantages of my novel combustors are that they are simpler, easier to cool, and less expensive than those typically available and can be substituted for the latter without major redesign of combustor-associated components or systems. Up- and downsizing are not fundamental problems, and CIVIC combustors can be produced (or used) in all presently employed combustor configurations—can, canannular, annular, and axisymmetric annular.

That size is not a dominant design constraint of my novel combustors is especially unexpected in view of the well-known problems in scaling fuel drop size to combustor size, especially as the size of the combustor is reduced.

CIVIC combustors are also readily adaptable to dual (liquid and gas) fuel operation.

A further advantage of my invention is that I can readily provide optimum performance, with respect to the various objectives stated above, for fuels so diverse as high viscosity, difficult-to-evaporate liquid fuels on one hand and low BTU content gases and liquified gases such as ethane, propane, and butane on the other hand.

Air assist can, moreover, easily be employed in CIVIC combustors to: (a) generate liquid fuel droplets of the size needed for good flame performance; (b) promote the swirl air-fuel stratification essential in that "basic" operational mode of CIVIC combustors described above; and (c) as a novel means of forming a thin film of fuel.

Furthermore, in my novel combustors, the air can be supplied to the combustor in a variety of ways compatible with such diverse goals as minimization of emissions, maximum stable operating range, and efficient combustion of viscous liquid fuels and difficult-to-burn, low BTU content gaseous fuels.

Yet another important advantage of my novel combustors is that superior low emission operation can be made available by only simple modifications of the basic combustor to provide premixed fuel injection.

Because of superior flame stability and earlier ignition, much higher combustion air-to-fuel ratios can be employed in my combustors than is possible in conventional combustors. This is important as excess combustion air can consequently be utilized to form a uniform, cool (lean) fuel-air mixture that, at least in gas turbine applications, will have emission levels in the range contemplated in proposed stringent standards yet also provide an extended low emission operating range.

Similarly, a variety of co- and contrarotating combinations of swirl air, atomizing air, and fuel flows can be used to advantage in various CIVIC combustor applications to control fuel droplet size and the rate at which the subsequently vaporized fuel is mixed with the main air swirl to promote such important and often contradictory objectives as minimum emissions and maximum flame stability.

Another important advantage is that instantaneous switching between low emission operation and the stratified charge mode of operation can easily be made without adding substantially to the complexity of the combustor. This is particularly significant because such dual mode operation has heretofore typically required the complexity and cost of two sets of injectors, one for premix injection for low emissions and another for stratified injection to provide adequate flame stability. The additional injector set with its attendant cost and problems such as fuel manifold emptying and filling are eliminated by my invention.

Also, in my novel combustors, the incoming combustion air can be used, in many instances essentially "cost free", to cool the combustor dome, to prevent the build-up of carbon deposits in marginal operating conditions, and to promote the formation of the fuel film and atomization of the fuel in the low emission operating mode.

From the foregoing it will be apparent to the reader that the provision of novel, improved combustors is the primary object of the present invention.

Other, also important but more specific, objects of my invention reside in the provision of combustors:
which are efficient over wide operating ranges;
which provide a superior, short, stable, cool, smokeless, and non-luminous flame;
which can be made to operate with one injector system both in a stratified charge mode and in a premix low emission mode;
which, even in the stratified charge mode of operation, have relatively low emissions;
which are simple, inexpensive, and relatively easy to cool;
which can be readily scaled up and down in size and which can be produced in all of the conventional combustor configurations;
which are designed to efficiently burn typically difficult-to-burn fuels ranging from gases of low BTU content to viscous liquids;
which can be substituted for conventional combustors without major redesign of the systems in which they are employed;
which are versatile both in terms of the features discussed above and others relating to their construction and operation and in terms of the uses to which they can be put;
which have various combinations of the foregoing attributes.

Still another important, primary object of my invention is the provision of novel, improved methods of burning gas and liquid fuels which provides various ones of the advantages discussed above.

Still other important objects and features and additional advantages of my invention will become apparent to the reader from the appended claims and as the ensuing detailed description and discussion proceeds in conjunction with the accompanying drawing in which:

FIG. 1 is a longitudinal section through a combustor embodying and constructed in accord with the principles of the present invention;

FIG. 2 is a section through the combustor of FIG. 1, taken substantially along line 2—2 of the latter figure;

FIG. 3 is a side view of a gas turbine engine equipped with a combustor embodying the principles of the present invention, part of the turbine housing being broken away to show its internal components;

FIG. 4 is a longitudinal section through a second form of CIVIC combustor which has both normal "stratified charge" and premix low emission modes of operation;

FIG. 5 is a schematic diagram of a system for switching a combustor like that shown in FIG. 4 between normal and low emission modes of operation;

FIGS. 6 and 7 are longitudinal sections through third and fourth forms of combustors which embody the principles of my invention; the combustor of FIG. 6 has the advantage that the combustor dome is cooled by primary combustion air at an essentially zero energy cost; and, in both combustors, build-ups of deleterious carbon deposits are inhibited;

FIGS. 8 and 9 are partial longitudinal sections through fifth and sixth forms of my invention which provide superior flame performance during start-up and greater control over various facets of combustor operation;

FIG. 10 is a partial longitudinal section through an alternate form of fuel injector for CIVIC combustors which are somewhat similar in form to the combustors shown in FIGS. 8 and 9;

FIG. 11 is a section through the injector of FIG. 10, taken substantially along line 11—11 of the latter figure;

FIG. 12 is a view similar to FIG. 10 of an injector employing a similar technique for forming the thin film of fuel typically wanted in a combustor of the character described and claimed herein and constructed in accord with the principles of the present invention;

FIG. 13 is a longitudinal section through a combustor in accord with the principles of the present invention which employs a premix mode of fuel injection somewhat different from those modes previously described; and FIG. 14 is a longitudinal section through a novel axisymmetric annular combustor constructed in accord with the principles of the present invention.

Those exemplary embodiments of my invention described in the detailed description which follows are to some extent alike. To the extent that this is true, identical reference characters will be employed to identify structural components, etc. which are alike.

Referring now to the drawing, FIGS. 1 and 2 depict a CIVIC combustor 20 constructed in accord with and embodying the principles of the present invention.

The major components of combustor 20 are: (a) a cylindrical, elongated casing 22 which has an upstream section 24 and a downstream section 26 connected by a radially extending transition section 28, and (b) a liquid fuel injector 30 concentrically disposed in the upstream casing section 24 with its forward or downstream end 32 spaced upstream from the downstream end of that section.

Injector 30 cooperates with upstream casing section 24 to form an annular combustion air passage 34 having an inlet 36.

Disposed in the combustion air passage adjacent inlet 36 and extending between casing section 24 and injector 30 is a set of radially oriented, equiangularly spaced, longitudinally extending swirl vanes 40. The latter impart a swirl, or rotational component, to combustion air introduced into passage 34 through inlet 36 as indicated by arrow 42 in FIG. 1. A swirling or rotating, axially moving annulus of combustion air is thereby formed in the passage.

Fuel is typically introduced into the injector 30 of combustor 20 through a fuel line 44. The fuel line communicates through a radially extending passage 46 in the injector with an annular passage 48. Typically, the fuel line might be connected to passage 48 through one of the swirl vanes 40 to minimize flow disturbances in the combustion air passage.

The annular fuel passage 48 extends axially downstream and then angles outwardly and opens onto the exterior surface 49 of the injector at a location spaced upstream from the downstream face 32 of the latter.

Fuel supplied to the injector is consequently discharged in an annulus onto the exterior surface 49 of injector 30 at the precise location corresponding to the outlet of annular passage 48.

Extending downstream from the fuel passage outlet is a fuel film zone 50 in which the swirling combustion air moving through passage 34 spreads and thins the fuel into a stratified film 52. This stratification persists as the swirling air reaches, and moves downstream from, the face 32 of the injector. There, the film of fuel leaves the surface 49 of the injector and attaches precisely to the inner boundary of the combustion air annulus.

The fuel film zone 50 must be long enough to insure that a thin, relatively uniform film of fuel is formed. On the other hand, it cannot be too long; or an unwanted, and excessive, amount of the fuel will evaporate prematurely, producing flame instability and, potentially, premature ignition and possible burn-out of the injector.

For can-type combustors of practical sizes, fuel film zone lengths of 0.5 to 1.5 inches will typically prove satisfactory.

For the reasons just discussed, overheating and consequent excessive evaporation of the fuel delivered through the injector must also be avoided. This goal can be realized by employing the injector construction discussed above and shown in FIGS. 1 and 2. That construction also has the decided advantage that it is much less complex than structures heretofore proposed for comparable purposes.

That this simple method of forming a stratified fuel film has heretofore been overlooked is not surprising. The swirling combustion air may generate forces of 70,000 g or higher, particularly in the smaller combustors; and logic suggests that such high forces would dislodge the film of fuel from the inner boundary of the combustion air annulus. That they do not, especially when care is exercised in precisely placing the fuel on the external surface of the combustor as described above, is an entirely unexpected result.

Extending downstream from fuel film zone 50 and the end 32 of fuel injector 30 is a flame stratification zone 54 which reaches to the downstream end of upstream combustor casing section 24. The fuel making up film 52 is atomized in zone 54 by virtue of the high velocity swirl combustion air assisted, when necessary, by air flowing from an axially extending, central passage 56 in injector 30 into a radially extending, annular slot 58. Radially oriented, equiangular spaced vanes 60 in passage 58 impart a rotational component or swirl to the assisting atomizing air, which is subsequently discharged at high velocity from slot 58 against the inner side of fuel film 52.

This unique combination of a thin fuel film derived from high velocity combustion air and high velocity assisting atomizing air is most important because of its superiority in producing small diameter droplets of fuel. These small droplets are remarkably resistant to centrifuging owing to their high drag and low inertia. This is important because the natural tendency is toward radial movement of the fuel outwardly into the swirling annulus of combustion air; and this would cause a notable deterioration in the flame produced by the subsequent combustion of the flame, especially in its stability.

Generally, at least the stoichiometric amount of air required for the combustion of the fuel supplied to the combustor is delivered through combustion air passage 34; and excess air is preferably supplied in typical applications. That this can be done is also an important feature of combustor 20 as well as those other embodiments of my invention to be described hereinafter. The supply of (particularly excess) air in this manner results: in a very cool, non-luminous, and short flame which remains stable over a wide operating range; in the absence of smoke; and in a combustor having walls that remain cool. In short, the characteristics of a high quality natural gas burning combustor are obtained with liquid fuels. This is important in terms of simplicity, reduced manufacturing costs, and long service life as well as for the other reasons discussed above.

In contrast, comparable attempts to supply excess combustion air in heretofore proposed combustors have invariably failed because of inadequate flame stability. This generates such major problems as smoke, overheated combustor walls and an attendant short service life. Inadequate flame stability also severely limits the operating range of the combustor in applications such as high altitude gas turbine operation, for example.

Despite the foregoing, the provision of excess combustion air in the outer swirl annulus is not a requisite to the successful operation of combustor 20. For example, it is often preferable to supply a more nearly stoichiometric amount of air in that fashion when heavier, more viscous and difficult-to-burn fuels are being employed because higher flame temperatures can be reached to enhance fuel evaporation.

Furthermore, even a deficiency of air can be advantageously supplied in the outer swirl annulus in some circumstances—e.g., in the burning of low BTU gases and, notably, in the combustion of fuels having a high content of fuel-bound nitrogen as this reduces the tendency toward the formation of noxious nitrogen oxides.

The amount of assisting atomizing air that might be used is a small fraction of that delivered through combustion air passage 34.

Typically, swirl blades 60 in discharge slot 58 will be oriented to impart to the atomizing air a rotational component opposite that imparted to the combustion air in passage 34 by vanes 40 (counterswirl). This maximizes the resistance of the atomized fuel to centrifuging (i.e., radial outward movement into the swirling combustion air) by virtue of improved fuel atomization and because, as the fuel droplets are momentarily moved in contraflow to the main air swirl, by virtue of a momentary reduction in the centrifugal forces on the fuel droplets.

In addition such contraflow of assisting air, by virtue of increased shear between the fuel, combustion air, and recirculating gases, minimizes the tendency for such assisting air to excessively delay ignition.

Ignition having been obtained, the presence of swirl forces is necessary for the maintenance of the fuel stratification. These contradictory requirements of initial minimization of centrifugal force, immediately followed, after ignition, by maintenance of a high centrifugal force are well-satisfied when the assisting air is of sufficiently small quantity to have only a local, temporary inhibition on the centrifugal force effects.

Counterswirl is not essential in all cases as even a high velocity axial flow will minimize centrifuging to a marked extent because the strong axial force thereby exerted on the fuel droplets inhibits centrifuging only momentarily but long enough to provide time for ignition.

Rotation of the atomizing air in the same direction as the main combustion air (coswirl) may even prove satisfactory when low viscosity fuels of high volatility are being burned.

In conditions where good atomization is obtained by virtue of the high velocity swirling combustion air alone (as it might be with a relatively high swirl air velocity and a relatively low viscosity fuel) the assisting atomizing air may be deleted and maximum flame stability obtained as a consequence.

The flexibility of operation thus provided by air assist is important because of the additional control afforded over the fuel droplet size and the rate at and extent to which the fuel is subsequently mixed with the main combustion air. For example, coswirl of this assisting air demonstratably lowers $NO_x$ generation at the expense of reduced flame stability while counterswirl significantly improves flame stability but results in higher emissions.

That such extensive control can be exercised, especially over fuel droplet size, droplet centrifuge, and ignition delay, is entirely unique. The prior art is replete with statements of the problems encountered in scaling fuel droplet to the combustor size, especially in small and downscaled combustors. The prior art also completely ignores the problem of fuel droplet placement and the need to avoid air dilution of the hot recirculation gases.

As the atomized fuel continues through flame stratification zone 54, it is vaporized by a hereinafter described mechanism which is peculiar to CIVIC combustors.

At the downstream end of zone 54, the swirling or rotating stratified annulli of combustion air (at ca. 1250° R. in a simple cycle gas turbine of 16:1 pressure ratio) and coswirling vaporized fuel at ca. 3750° R. is rapidly expanded into a combustion zone 61 by virtue of the increased diameter of downstream combustor section 26. This greatly reduces the centrifugal forces of the swirl flow as, for the typical free vortex air flow, they are an inverse function of the cube of swirl flow radius.

Typically, the radius of section 26 will be 2.5 times the radius of injector 30. Consequently, the centrifugal forces will be reduced by a factor of approximately 16 as the swirling gases reach the upstream end of casing section 26. The increased diameter of the downstream combustor section 26 can be made larger or smaller in diameter to respectively increase or decrease the rate of fuel-air mixing or combustion. I thereby effect a control over the rate of combustion that cannot be obtained in currently available combustors.

The rapid reduction of the centrifugal, swirl air force, another salient feature of my invention, results in rapid mixing between the evaporated fuel and combustion air. This is important in that it leads directly to efficient combustion and a short flame.

As shown in FIG. 1, the swirling fuel-air mass expands outwardly as it moves downstream through the combustion zone to an extent limited by the downstream casing section 26 of the combustor. Further downstream, the swirling or rotating gases contract inwardly as indicated by arrows 62; and the previously formed annulus ceases to exist although the rotation or swirl of the gases continues as indicated by arrow 64.

The aerodynamic flow mechanism just described results in the creation of an inner recirculation zone 66, which is the main flame stabilizing mechanism in combustor 20, and an annular, outer recirculation zone 68. Hot gases flowing upstream in the inner recirculation zone 66 as indicated by arrows 70 and 72 ignite fuel atomized in the flame stratification zone 54. However, because mixing of the hot fuel and the cool combustion air is strongly inhibited by centrifugal force effects, only a small percentage of the fuel can be burned in the flame stratification zone, a key to flame stability and non-luminous combustion.

Nevertheless, this limited combustion is sufficient to evaporate the remainder of the atomized fuel and raise it to a very high temperature because the latent heat of evaporation of a liquid fuel is on the order of only 130 BTU per pound while the heat of combustion is typically ca. 18,500 BTU per pound.

Thus, the flame stratification zone represents an area for the gasification of the liquid fuel. This is a most unique and advantageous feature as, in typical flames, fuel evaporation is of a most random sort; occurs in all areas of the main combustion zone; and is, as a consequence, mainly responsible for many deficiencies such as smoke, instability, combustion inefficiency, long flame, carbon build-up, hot walls, high $NO_x$, etc.

Evaporation of the atomized fuel results in the formation of a thin annulus 74 of hot, evaporated fuel at the inner boundary of the swirling annulus of relatively cool combustion air. The fuel annulus rotates in unison with the annulus of combustion air as was pointed out above.

The high centrifugal forces acting on the swirling, hot vaporized fuel and the cool swirling combustion air greatly inhibit the fuel's tendency to move radially and mix with the combustion air until the end of the flame stratification zone is reached and fuel-air mixing is promoted by the rapid decrease in the centrifugal force.

Downstream from flame stratification zone 54, the bulk of the fuel-air combustion mixture burns in combustion zone 61. This burned fuel-air mixture supplies the hot gases necessary for ignition in the inner recirculation zone 66 and the outer recirculation zone 68. The second of these ignition sources is, however, not critical in the stratified charge operation of CIVIC combustors; and, as will be discussed below, there are advantages to be gained in certain circumstances by eliminating it.

The just described method of fuel injection, evaporation, and controlled stratification is of paramount importance because it results in excellent flame stability and a non-luminous, blue flame typically obtained only by burning gas fuels.

I pointed out above that the amount of air supplied through combustion air annulus 34 may deliberately be kept below that sufficient to effect complete combustion of the fuel delivered through injector 30 as when a maximum range of stable operation is required or a fuel having a high fuel-bound nitrogen content is being burned. In these circumstances, the additional air required to complete the combustion is supplied through dilution air ports 76 as indicated by arrows 78 in a more-or-less conventional manner. However, care must be taken in configuring, sizing, and locating these apertures so that the air supplied to the combustor through them will not penetrate to inner recirculation zone 66 as that seriously deteriorates the quality of the flame. In typical gas turbine combustor practice, such air ports are deliberately designed to penetrate into the inner recirculation zone. As a consequence, significant advantages of CIVIC combustion are lost.

As will become apparent hereinafter, many modifications may be made in the exemplary CIVIC combustors disclosed herein without exceeding the scope of the present invention. A representative modification of that character which is particularly adaptable to injectors of the type illustrated in FIG. 1 is the replacement of annular fuel distribution passage 48 with an annular array of holes or slots opening onto external injector surface 49 and preferably skewed to swirl the fuel in the same direction as the combustion air supplied through passage 34. Other modifications of a comparable character will be described hereinafter.

Gas turbine engine applications of my invention have to some extent been emphasized above.

FIG. 3, in this respect, illustrates a so-called radial gas turbine engine 80 equipped in accord with the principles of the present invention with the CIVIC combustor 20 illustrated in FIGS. 1 and 2.

Engine 80 is a commercially available, Solar Turbines International Gemini. It will, accordingly, be described herein only to the extent necessary for an understanding of the present invention.

Engine 80 includes a casing 82 housing a single stage radial compressor 84 and a radial, single stage turbine 86 mounted in back-to-back relationship on shaft 88. The compressor-turbine-shaft assembly is rotatably supported in casing 82 by bearings 90 (only one of which is shown).

Combustor 20 is supported from casing 82 on the downstream side of turbine 86 in an auxillary housing 91.

Air enters casing 82 through an annular inlet 92 at its upstream end and flows in an axial direction past vanes 94 into compressor 84.

The compressor discharges the air through a passage 95 between casing 82 and an inner jacket 96 past diffuser vanes 98 into an annular passage 100 between combustor 20 and auxillary casing 91.

Part of this air flows into the main combustion air passage through inlet 36 as indicated by arrows 104, and the remainder flows into the combustor through secondary or dilution air ports 76 as indicated by arrows 106 when air in more-or-less sufficient quantities for complete combustion passes through inlet 36. Where insufficient air for complete combustion is supplied through inlet 36, additional air in an amount sufficient to complete combustion is supplied through air ports 76; and, ordinarily, an additional set of air ports is provided further downstream to dilute the hot combusted gases to acceptable temperatures. Additional air may also be supplied as necessary, as is typical practice, to cool the combustor walls.

Fuel is supplied through line 44, and an ignitor 108 is provided to ignite the fuel at light-off.

Thereafter, the combustor operates as described above.

The hot gases generated in combustor 20 are discharged into an annular plenum 110 and flow from the latter through nozzle ring 112 into turbine 86 to drive the latter as indicated by arrows 114.

Gases discharged from the turbine are exhausted through a manifold 116 as indicated by arrows 118 and 120.

By virtue of the foregoing, turbine 86 drives compressor 84 and, in addition, generates additional energy which is available at shaft 88.

Another important advantage of my invention, especially in turbine engine applications such as that just described, is that, with only minor modifications, a combustor as illustrated in FIGS. 1 and 2 may be made to operate in either a premixed lean or a fuel rich low emission mode of operation as well as in the stratified mode discussed above. This is most important in the case of premixed lean combustion because efficient premixed lean combustion is ordinarily restricted to a relatively narrow operating range near the design point whereas my novel combustors are capable of efficiently operating over a wide range in the stratified charge mode. Consequently, combustors of the character in question can be operated in the stratified charge mode in light-off, part load, and other off-design conditions and then switched to the low emission mode at full load and other near-design point conditions to take advantage of the reduced emissions this provides.

Such staged or dual mode operation can also be employed when premixed rich combustion is employed to reduce $NO_x$. While premixed lean combustion has air in excess of that required for complete combustion supplied through swirl annulus 34, premix rich combustion has a deficiency of combustion air thus supplied. The additional air required to complete the combustion is added downstream in a manner which keeps it from entering the recirculatory ignition zone or zones.

Dual stage combustors have heretofore been proposed. Invariably, however, they have required two sets of fuel injectors and two fuel injection systems. This both introduces unwanted complexity and makes the system expensive to manufacture and service. Dual injector sets are made unnecessary by the present invention.

A dual stage combustor of the character just described which embodies the principles of the present present invention is illustrated in FIG. 4 and identified by reference character 124.

Combustor 124 differs from combustor 20 primarily in that its injector 126 has a second, annular, radially and axially extending slot 128 through which air is discharged to drive the combustor into the low emission operating mode. Equiangularly spaced, radially extending swirl vanes 130 are disposed in slot 128 to impart a swirl or tangential component to the air.

Air is delivered to discharge slot 128 through a central passage 131 in an amount which is a small fraction of that required for complete combustion but typically greater than the amount required for assisting fuel atomization.

Atomizing air is, in this combustor, supplied through a concentric, annular passage 132 surrounding passage 131.

For air at the same pressure, temperature, and velocity, a sizing of annuli 34, 58, and 128 that results in mass flows in the approximate proportions of 92 to 1.2 to 6.8 is satisfactory.

In the low emission mode of operation, combustor 124 operates like combustor 20 except that the air discharged through inner slot 128 forms a swirling or rotating annulus 134 which isolates the hot gases in recirculation zone 66 from the fuel. The atomization assisting air (typically only used in the stratified charge mode) is switched off, and fuel atomization assistance is provided by the air discharged through slots 128.

At the downstream end 32 of injector 126, the atomized fuel immediately begins to centrifuge outwardly into the combustion air supplied through passage 34, evaporating and mixing with the latter because immediate ignition and consequent stratification is not obtained. Further downstream, as the annulus of combustion air expands, and the centrifugal force on the fuel is relaxed, the fuel moves outward and inward, the latter mixing with the air discharged through slot 128.

The mechanisms just described result in the formation of a premixed annulus of evaporated fuel and combustion air identified by reference character 136.

This mixture is ignited at axial location 138 by the hot gases circulating in outer recirculation zone 68 and at location 140 by the hot gases in the inner recirculation zone 66 represented schematically in the drawing.

Thus, in the low emission mode of operation, ignition of the fuel is "retarded" whereas, in the stratified charge mode of operation, ignition of the fuel is "advanced". Such precise control of the ignition point is a unique and most advantageous feature and is of remarkable simplicity.

In the low emission mode of operation, the hot, swirling and burning gases are adjacent to the relatively cool, swirling, combustion air. The high, centrifugally induced forces attributable to the density differences between these gases consequentially cause the flame to rapidly converge inwardly downstream from ignition point 138 as shown by arrows 142.

From ignition at station 140, the centrifugal forces inhibiting flame spread are high enough that the flame slowly moves out and downstream as shown by arrows 144.

The mechanism of flame propagation in the premixed mode is nevertheless similar to that in the stratified charge mode. Flame propagation is controlled by turbulence modified by the centrifugal force effects of inward and outward flame propagation. This is very important as it is commonly (and erroneously) stated and assumed in the prior art that premixed flame propagation is controlled by chemical reaction criteria which is difficult to scale. Flame propagation dominantly controlled by turbulence, i.e. by aerodynamic means, is in contrast relatively easy to scale following simple geometric proportioning.

There are circumstances, particularly in very large combustors, when reaction rate criteria can influence design because autoignition can occur. This problem, if encountered, can be solved by using more combustors of smaller size. Autoignition is unlikely in typical combustors as the mechanism of premixing is unusually speedy.

The centrifugal force effects discussed above are important because they guarantee a very short flame even under the slow burning, low temperature conditions that exist when excess combustion air is supplied. Thus, the very slow combustion typical of a premixed lean flame can be avoided.

Operation of a combustor as shown in FIG. 4 in the low emission mode results in a non-luminous flame with barely preceptible blueness, which is desirable and ordinarily most difficult to obtain when burning liquid fuels.

Furthermore, a combustor of the type illustrated in FIG. 4 has a demonstratable turndown (maximum to minimum fuel flow at a fixed air flow) ratio from excessive $NO_x$ production to flameout of more than two when used in the premixed lean mode. This is near the theoretical limit and is much greater than is typically obtained in premixed lean combustors.

Most often, swirl vanes 130 are oriented to rotate the air discharged from slot 128 is more-or-less the same direction, and at generally the same velocity, as the air supplied through combustion air annulus 34. This minimizes turbulent shear and hence conserves air. Considerable latitude is often permitted in this regard, however; and the air can be discharged in a downstream direction without swirl or even rotated in a counterswirl direction to delay the premixing of the air and fuel if the circumstances dictate. Also, the formation of the swirl annulus which isolates the inner recirculation zone and prevents fuel stratification can be outboard, rather than inboard, of the fuel atomizing air although this will typically prove less efficient.

To switch between the low emission and stratified charge modes of operation, provision must be made for shutting off the supply of air to the central injector passage 131. A system for accomplishing this is shown installed in a schematically illustrated, axial flow, gas turbine engine 146 in FIG. 5.

That engine includes, in addition to combustor 124, a schematically illustrated compressor 148 and turbine section 150, all housed in casing 152.

At full load or near design point operation, compressor discharge air is supplied to main combustion air passage 34 as indicated by arrows 154 and to passage 131 through a schematically illustrated passage 156 which might, in actual practice, be within the outer confines of the turbine casing. Compressor discharge air for aiding atomization is supplied when necessary to passage 132 in injector 126 through similarly illustrated passage 158.

In the low emission mode of operation, valve 160 in passage 156 is open, and valve 162 in passage 158 is closed; and the combustor operates in the low emission mode discussed above to heat the compressor discharge air and supply hot gases to turbine section 150 which drives the compressor and provides power at output shaft 163.

Under part load or light-off conditions, valve 160 is closed and valve 162 opened, instantaneously switching the combustor to the stratified charge mode of operation discussed above in conjunction with combustor 20.

Another desirable feature incorporated in turbine engine 146 is an air assist system including a pump 164 connected through a normally closed valve 166 and passage 168 to atomizing air supply passage 158.

In marginal operating conditions such as light-off, the compressor discharge pressure is typically lower than that needed for adequate atomization of the fuel. In this case, valve 162 can be closed, valve 166 opened, and pump 164 actuated to make atomizing air available to the combustor at the wanted pressure for starting in the stratified charge mode. As the engine comes up to speed, the positioning of the valves may be reversed and compressor discharge air employed to assist in atomizing the fuel. Or, if a viscous, non-volatile fuel is being burned, the air assist pump may be left in operation to insure adequate atomization of the fuel.

It was pointed out above that combustor 124 has a heretofore unattainable range of low emission operation.

Even this increased range of operation may be significantly extended to higher air-fuel ratios by modulating the flow of air through inner passage 131 and discharged through annular slot 128 and the flow of air through passage 132 and discharged through slot 58. This may be accomplished in an engine as shown in FIG. 5, for example, if valves 160 and 162 are butterfly or other modulating type valves.

Specifically, with valve 160 open and valve 162 closed, the centrifuging of the atomized fuel and the mixing of that fuel with the combustion air is maximized. Then, with a reduction of engine power from design point, as valve 160 is closed and valve 162 opened, the centrifuging effect on the fuel is reduced, especially if counterswirl of the assisting atomizing air and of main combustion air is employed; and the premixing of the air and fuel is consequently reduced; but premixing and consequent low emissions nevertheless exist over a range considerably beyond the typical low emission turndown ratio of two.

The combustors of the present invention thus far described have employed axial swirlers. This is not essential, however, as there are various ways of generating swirl; and additional advantages may even be gained by employing radial inflow swirlers as shown in the combustor 172 illustrated in FIG. 6.

That combustor has a cylindrical casing including an outer section 176; a centrally apertured, radially inwardly extending section or dome 178; and an inner, tubular section 180 which extends downstream from dome 178 to the combustion zone 61 within outer casing section 176.

The combustor also includes an injector 182 which may be of any of the several types described herein.

Combustor inner casing section 180 and injector 182 are arranged in the same physical relationship and cooperate in the same manner as the injector 30 and upstream casing section 24 do in combustor 20 to form a longitudinally extending, combustion air flow passage 184.

Air is supplied to annular passage 184 through an inwardly extending, annular passage 186 formed principally by combustor dome 178 and a radially oriented member 188 spaced upstream from the dome and surrounding injector 182 at its inner periphery. An annular array of equiangularly spaced swirl vanes 190 is mounted in, and spans, passage 186.

The wanted swirl or rotational component is imparted to the air entering passage 186 through inlet 192 by these vanes. The air then flows into passage 184 and moves downstream, typically but not necessarily in free vortex flow, in the form of a swirling or rotating annulus as in the embodiments of my invention described above.

The air supply arrangement just described has the advantage that, without expenditure of additional energy, the combustion air can be employed to keep the hot gases in outer recirculation zone 68 from overheating combustor dome 178. In the previously described combustors, in contrast, additional provision may have to be made for cooling the comparable structural parts of combustors 20 and 124.

At the same time, the combustion air passage forming section or wall 180 will be heated to a temperature well below its structural limit (typically 1200° F.) but hot enough to insure that any fuel inadvertently centrifuged out through the combustion air annulus, as may occur during marginal operating conditions, will be burnt off. This prevents deleterious carbon build-up, a typical major combustor problem.

Aside from the foregoing, the modus operandi of combustor 172 is as previously described (while a stratified charge mode of operation is shown, it will be obvious to the reader that low emission capability can be provided simply by providing an appropriate injector).

The deleterious build-up of carbon deposits can also be avoided in a manner similar to that just described in a combustor employing an axial, rather than radial inward, swirl flow.

A combustor 196 of that character, shown in FIG. 7, has a cylindrical, outer housing or casing 198 terminating in an inclined, radially inwardly extending dome 200 at its upstream end. A tubular component 202, which corresponds to the upstream casing section 24 of those combustors illustrated in FIGS. 1 and 4, extends through dome 200 to the combustion zone 61 of the combustor.

An injector 206, housed within tube 202, cooperates with the latter to form an annular, main combustion air flow passage 208 comparable to the flow passage 34 of combustors 20 and 124. Swirl vanes 209 are disposed in this passage adjacent the inlet 210 at its upstream end.

As will be apparent from FIG. 7, the recirculating hot gases in outer recirculation zone 68 heat that part of combustion air tube 202 downstream from dome 200. In a manner closely allied to that employed in combustor 172, this prevents fuel, centrifuging out through the annulus of combustion air in passage 208 as a consequence of inadequate stratification, from building up carbon deposits on structural components of the combustor. At the same time the combustion air flowing through component 202 keeps it from being overheated.

The injector 206 of combustor 196 provides both stratified charge and low emission modes of operation like the injector 126 of combustor 124. Structurally, however, it differs considerably from the latter.

Specifically, injector 206 includes a cylindrical central member 212 surrounded by a cylindrical outer member 214. The latter has a bell-shaped configuration at its forward or downstream end 216. The bell shape of the downstream injector end is not critical. What is required is a smoothly flowing surface from the annular fuel passage to the end of the injector which will not violently change the direction, and hence cause disruption, of the fuel film.

Located between the outer and central members 214 and 212 of injector 206 are annular fuel, atomizing air, and stratification zone shut-off air passages 218, 220 and 222. Those passages are spanned by swirl vanes 224, 226, and 228, respectively.

Despite the differences in structure just described, the modus operandi of injector 206 is much like that of injector 126; and, a typical sizing of these varied air flow flow annuli which provides satisfactory results is when the air flow through these annuli, at the same pressure, temperature, and velocity, results in respective mass flows in the same approximate proportions as in injector 126.

Fuel delivered through annular fuel passage 218 is formed into a thin film 230 on the bell-like downstream portion 216 of the injector, at the inner boundary of the swirling combustion air annulus formed in combustion air passage 208, by coswirling air supplied through annulus 220.

Formation of the fuel film can also be promoted in injector 206 by orienting swirl vanes 224 to produce coswirl between the fuel and the main combustion air stream.

The fuel is atomized by the main combustion air discharged at high velocity from annular passage 208 at the common axial location where the fuel is discharged; viz., at the upstream end of the bell-shaped section 216 of the outer injector component.

In the stratified mode of operation shown in FIG. 7, the fuel is thus very precisely located along the combustion air annulus and sandwiched between the latter and the hot gases in inner recirculation zone 66 as in the previously described embodiments of the invention.

If sufficient fuel pressure is available to provide fuel swirl, the flow of air through annulus 220 needed to promote formation of the fuel film can be reduced or eliminated. This enhances flame stability as the absence of fuel filming air promotes the instantaneous ignition that produces stability. Thus, the use of fuel pressure to swirl and provide a thin fuel film is an advantageous feature of this injector.

In the low emission mode of operation, air introduced through the innermost annular passage 222 and, when used, the air assist that promotes the filming, shuts off (or isolates) the inner recirculation zone 66 from the atomized fuel, delays fuel ignition, and thus effects a premixture of the fuel and combustion air and subsequent combustion of the latter in a manner akin to that discussed previously.

There are conditions which best effect the low emission mode of operation and are applicable to all injectors of the type just described. Coswirl of the fuel film assist air with the main combustion air and fuel pressure swirled fuel best promote the proper functioning of the air supplied through inner passage 222, especially if the latter swirls in a similar direction. If a low emission mode is not required, passage 222 can be deleted and the fuel pressure and fuel film assist air both swirled contra to the main combustion air swirl to promote maximum shear for best stratification if such is needed.

Air assist supplied through passage 220 as from an air pump in conditions such as light-off can also be used to particular advantage in injectors of the type shown in FIG. 7 because the wanted fuel film 230 may otherwise be difficult to form. This method of forming the fuel film in the absence of significant fuel pressure to generate it is a unique feature not used in present combustor designs.

When low emission premix operation is required, valves and ducting as schematically shown in FIG. 5 can be employed to make the combustor capable of functioning in the wanted manner discussed above.

A combustor like that shown in FIG. 7 but with air assist to further promote fuel atomization is shown in FIG. 8 and identified by reference character 236.

The injector 238 of combustor 236 is similar to the injector 206 just discussed; but it has a second, axially inclined, annular, atomizing air discharge slot 240 opening onto its outer surface near or at the downstream end 242 of the injector. Air can be discharged through slot 240 alone, or in addition to that exiting from annular slot 220, to promote the atomization of fuel delivered through annular passage 218. This is particularly advantageous in marginal conditions such as light-off and when viscous, difficult-to-atomize fuels are being burned.

For air at the same pressure, temperature, and velocity, a sizing of annuli, 208, 240, 220, and 222 that results in mass flows in the approximate proportions of 89.5 to 2.7 to 1.2 to 6.6 is satisfactory.

The provision for a second, overlying or encompassing annulus of atomizing air is especially exploitable when provided in association with air assist in gas turbine engine applications, for example.

During start-up, primary, or underlying, atomizing air is supplied from pump 164 through valve 166 and external passage or line 244 to atomizing air injector passage 220; and the secondary, overlying, atomizing air is pumped from external passage 244 through an axially extending, internal passage 246 in the injector to discharge slot 240.

Thereafter, unless a viscous fuel is being burned, the pump is typically shut down, valve 166 closed, and valve 162 opened. This results in compressor discharge air being supplied to the inner, atomizing air discharge slot 220 via external passages 248 and 249 and to the outboard discharge slot 240 via external and internal passages 248 and 246. In conditions where sufficient fuel pressure is used to generate a thin fuel film 230 in normal engine operation the elimination of air through passageways 240 and 220 will not deteriorate fuel atomization and will maximize flame stability.

Annular discharge slot 240 is preferably configured to direct the high velocity air exiting from it axially downstream with no swirl as this promotes the formation of the wanted small fuel droplets. This also momentarily inhibits outward movement of the atomized fuel by centrifuging. This, as has been emphasized, is important in achieving ignition and subsequent stratification, thus further enhancing flame performance.

Such axial delivery of this second stream of atomizing air is not essential, however; and it can be supplied in co- or counterswirling relationship to the main combustion air flowing through passage 208 to control such parameters as fuel droplet size and the mixing of the fuel and combustion air.

For example, coswirling of the main combustion air, the fuel, and the air discharged through passages 240 and 220 promotes mixing of the fuel with the main combustion air, reducing the generation of $NO_x$ but decreasing flame stability. This is, as described in conjunction with the injector shown in FIG. 7, most effective for the premix mode when additional coswirl air through passage 222 is required.

Conversely, by rotating the two streams of atomizing air and the fuel in the opposite direction to the main combustion air, improved flame stability can be obtained at the expense of an increased tendency toward $NO_x$ formation. This makes for less efficient operation in the premix mode.

For low emission operation additional ducting and valves must be supplied to control air supplied through passage 222. The system shown schematically in FIG. 5 is suitable for this purpose.

Combustor 236 additionally differs from combustor 196 in that it has a unitary casing 250 with a relatively small diameter upstream section 252 and a larger diameter downstream section 254 joined by an outwardly and axially extending transition section or dome 256.

In combustors 196 and 236 a stratified flame mixes out so rapidly that combustion is completed before the swirling outward flow is constrained by the walls 198 and 254 of those combustors. This assures that hot gas recirculation 68 will occur.

By reducing the diameter of the combustor wall at a downstream location the centrifugal force can be increased and combustion delayed so that hot combustion products will not contact the combustor walls until some distance downstream. This eliminates hot gas recirculation 68 and therefore eliminates cooling problems of the wall in that region. Such techniques can be used both for stratified and premixed combustion at the expense of an increase in flame length.

The feature described above is particularly applicable in the stratified charge mode of operation in which ignition from the outer recirculation zone 68 is essentially unneeded and contributes little. In the low emission mode, in contrast, the outer recirculation zone, though not essential, does play a significant role in minimizing the length of the flame. Consequently, in applications where premix and/or low emission operation is required, or desired, cognizance must be taken of the competing considerations just discussed.

One final distinction between combustors 236 and 196 is the substitution of the sheet metal closure 260 in combustor 236 for the central body 212 of combustor 196. This is primarily of structural significance and does not affect the operation of the combustor as described above.

Referring again to the drawing, FIG. 9 depicts a combustor 264 which conceptually differs from combustor 236 in that radial swirl inflow rather than axial flow of the main combustor air is employed. Fuel injection is as previously described.

Structurally, combustor 264 differs from combustor 236 primarily in the modification of the combustor casing and in the addition of an annularly extending closure component 266 to form an inwardly extending, combustion flow passage 268 in which swirl vanes 270 are disposed. This passage communicates with axially extending combustion air passage 208 in a manner akin to that shown in FIG. 6.

Component 266 also transitions into an axially extending portion 272 which surrounds the downstream section of injector 274 to form an axially extending annular passage 276 and an annular discharge slot 278 for an outboard stream of atomizing air. This also results in the outer member 280 of the injector being of a somewhat different, simpler construction.

Assist air is supplied in essentially the same manner as in combustor 236.

Compressor discharge air flows from an annular plenum 282 into the radially inwardly extending section of the main combustion air passage and, through schematically illustrated passages 248 and 249, to the secondary and primary atomization air discharge slots 278 and 220.

Various techniques for delivering the fuel through the injector to form and precisely locate a fuel of film, all employing an essentially continuous annular fuel discharge slot, or an annular array of commonly connected slots, were illustrated and/or discussed above. Those arrangements are not essential, however; and fuel delivery system involving an annular series of independent tubes or slots can instead be employed in any of the combustors described herein.

An injector with a fuel delivery arrangement of that character is illustrated in FIGS. 10 and 11 and identified by reference character 290.

Injector 290 has an outer body 292 of the configuration shown in FIGS. 7, 8 and 9.

Axially (or longitudinally) extending passages 294 are formed in and at more-or-less equiangularly spaced locations around this outer injector component.

At their upstream ends, passages 294 communicate with a fuel supply manifold (not shown).

The downstream ends of passages 294 communicate with radial, inwardly extending passages 296 which open onto the inner surface 298 of injector component 292.

As shown in FIG. 11, these passages are preferably oriented at a shallow angle to a tangent through the inner surface 298 of outer injector component 292. This provides a rotational component to the fuel exiting from those passages, thereby promoting the formation of a uniform film 300 on surface 298.

As shown by the injector 304 illustrated in FIG. 12, the radially extending passages, in this case identified by reference character 306, can also be angled toward the downstream end 308 of the injector.

Fuel delivery systems of the type illustrated in FIGS. 10 to 12 are particularly advantageous when using fuels with high vapor pressures—ethane and propane, for example.

Specifically, by appropriately restricting the size of fuel discharge passages 296 and 306, the fuel pressure can be kept high enough to significantly inhibit the formation of fuel vapor ahead of those passages and instead raise the velocity of the fuel discharged from them and thereby enhance the formation of the fuel film. Thus, under marginal conditions where air assist might otherwise be required to achieve a fuel film with low vapor pressure liquid fuels, it might often not be needed.

A fuel film zone of appropriate length becomes particularly important when fuel distribution schemes of the type shown in FIGS. 10 to 12 are employed because the fuel is placed at discrete locations around the surface on which the film is formed rather than continuously around it. Formation of a thin, uniform film can nevertheless be effected with flame stratification zones of the dimensions discussed above.

Thus far, the description of my invention has centered around the operation of CIVIC combustors on liquid fuels.

Such combustors, particularly those with fuel injectors of the character illustrated in FIGS. 4 and 7 to 12, have the advantage that they can equally well be operated on gas fuels in the stratified charge combustion mode. Excellent flame performance is obtained.

It is a singular advantage that the air supply passages of such injectors (particularly that required for the low emission mode of liquid fuel operation) can be used with appropriate valves and ducts to supply a gaseous fuel instead of air in the stratified charge operating mode.

Specifically, and as an example, because gases do not suffer the centrifuging problems of liquid fuels, the gas may be delivered through the annular slot 58 employed for low emission capability in the injector 126 of combustor 124 or through the corresponding passages of the later described combustors, preferably in coswirl relationship with the main combustion air. Thus, the gaseous fuel follows the same path through the combustor as the liquid fuel. Consequent to this likeness in paths, the flame performance differences between liquid and gas fuels are unusually small.

Furthermore, because the low density of typical gas fuels inhibits significant centrifuge an unusually excellent flame stability is typical even when burning difficult-to-burn, low BTU content gases, a benefit of decided importance.

This excellent performance on gas fuels of a CIVIC combustor is important as it allows room for major compromises with other desiderata without significantly comprising performance.

Alternatively, the gas may be delivered through the structure provided in a CIVIC combustor fuel injector to supply assisting atomizing air as ordinarily used during liquid fuel stratified charge operation again preferably, but by no means necessarily, in coswirl relationship to the combustion air.

Because the passage or slots through which the assisting atomizing air is supplied for stratified charge liquid operation will typically be much smaller than those air passages employed to furnish low emission capability, a disadvantageously higher fuel pressure may be required if the gas fuel is supplied through the atomizing air system. This is particularly true when low BTU content gas fuels are being burned because of the high fueling rates required.

On the other hand, the just discussed gaseous fuel supply arrangement has the advantage that, particularly at high fueling rates, the velocity of the gas discharged from the injector is high because of the high fuel pressures involved. This promotes mixing of the fuel and main combustion air thus tending to produce a premixed combustion mode. This, as a consequence, inhibits the formation of $NO_x$ at the sacrifice of flame stability.

The just described result generally obtains irrespective of whether there is a coswirl or counterswirl relationship between the gas fuel and the combustion air and even if the fuel is simply injected axially onto the inner boundary of the swirling annulus of combustion air.

That high gaseous fuel rates may result in some decrease in flame stability is likewise not necessarily a disadvantage. Typically, this requirement for flame stability will become a problem only in off-design conditions such as light-off or part load operation; and, during such conditions, the required fuel rates are much lower. Under these circumstances the mixing of the fuel and air is greatly reduced because the gas is discharged from the injector at reduced velocity. This improves flame stability, which may accordingly cease to be a problem.

CIVIC combustors may also employ conventional premix fuel injection in addition to, or in lieu of, those fuel injection techniques discussed above.

A combustor 312 with that mode of operation is illustrated in FIG. 13.

Combustor 312 is similar to the combustor 20 first described above but differs from the latter by the substitution of a central body or member 314 for the injector 30 of combustor 20 and by the addition of a system for injecting a gaseous or atomized liquid fuel into the upstream end of combustion air supply passage 34 and causing it to mix with the swirling annulus of air flowing through passage 34.

One fuel injector 316 is shown schematically in FIG. 13. In actual practice, an annular array of equiangularly spaced injectors would typically be employed.

Those skilled in the arts to which this description is addressed would be familiar with appropriate injectors and with suitable fuel preparation systems. For that reason, those components of combustor 312 will not be described in detail herein.

As will be apparent to the reader from the text to date and from FIG. 13, the operation of combustor 312 involves principles of the invention developed earlier in that a swirling or rotating annulus of combustion air, in this case premixed with fuel, is rapidly expanded into a combustion zone (318 in FIG. 13) where evaporation of the fuel and mixing with air may be completed. This mixture is ignited as it reaches combustion zone 318 by the hot gases in inner and outer circulation zones 66 and 68 which are generated in the manner discussed above.

The premix fuel injection mode of operation eases combustor wall cooling problems and improves combustor exit temperature distributions. In addition, emissions can be kept low.

A potential disadvantage of conventional premix fuel injection is a tendency toward autoignition which produces flashback fire and consequent destruction of the combustor. A most important feacture of CIVIC combustors is that, in contrast, premix of fuel in the low emission mode (as typically shown in FIG. 4) will not cause destruction of the combustor in the event of premature ignition or flashback because the fuel and air is premixed in the combustor proper rather than ahead of the combustor. It will instead merely raise the emission of $NO_x$.

One other disadvantage of premix fuel injection, at least in fixed geometry industrial gas turbine engine applications, is insufficient lean flame stability to provide a satisfactory range of operation. This disadvantage can be overcome, at the cost of increased complexity, by incorporating adjustable combustion air swirl vanes into the combustor.

Particularly advantageous when premix injection of an atomized liquid fuel is being employed is the radial inflow swirl arrangement shown in FIGS. 6 and 9.

Injection of the atomized fuel into a radial inward air swirl results in very efficient evaporation because the centrifugal swirl flow forces prevent large fuel droplets from escaping into the combustion zone until they have evaporated to a smaller size.

The central body or member 314 of the combustor 312 shown in FIG. 13 can be advantageously, and readily, replaced by injector 30 of combustor 20 or any other injector of a like sort.

Specifically, when flame stratification zone 54 is relatively short, the second, smaller, inner recirculatory ignition zone 319 shown in FIG. 13 becomes one with the larger recirculatory zone 66. However, if the length of zone 54 is increased to approximately the diameter of the central body or injector (two times D/2), a separate hot gas recirculation zone is formed. This is advantageous in that, in conditions such as lowered fuel flow when ignition zone 66 might be relatively cool, ignition zone 319 may nevertheless be relatively hot, thereby providing an improvement in flame stability.

This advantage is gained at a price. Where stratification of the fuel might be difficult, as in lighting off a heavy, non-volatile liquid fuel, a short zone 54 is advantageous because that assures high combustion efficiency through minimizing the time available for droplet centrifuge.

Another advantage of a lengthened zone 54 is independent of CIVIC combustors and instead gained in a conventional combustor using jet stirred recirculation. The recirculation zone 319 is isolated from such jet stirred recirculation. This provides a fuel evaporation zone of the character found in CIVIC combustors with consequent advantages in terms of reduced smoke and improved flame stability, all without significant redesign of the combustor.

The CIVIC combustors thus far described have been of can configuration; and they can, of course, be employed as such or in can-annular or annular systems.

That the principles of the present invention may also be applied to axisymmetric combustors is made apparent by FIG. 14 in which a CIVIC combustor of that configuration is identified by reference character 320.

Combustor 320 includes a cylindrical outer casing 322, an inner casing 324, a liner 326 surrounding the inner casing, and an annular injector 328 surrounding the latter. The foregoing components are all arranged in concentric relationship as shown in FIG. 14.

Outer casing 322, which is similar in configuration to the casing 198 illustrated in FIG. 7, has a relatively large diameter downstream section 330 terminating in a dome 332 at its upstream end. It also includes an upstream section 334 which extends through the dome into the combustion zone in combustor 320 to promote the cooling of structural components in the manner discussed above in conjunction with the combustor 196 of FIG. 7.

Inner casing 324 has upstream, transition, and downstream sections 336, 338, and 340 which parallel the upstream section 334, dome 332, and downstream section 330 of the outer casing.

Inner liner 326, which cooperates with the inner casing to form an annular, secondary air passage 342, parallels the upstream and transition sections of the inner liner. At its downstream end the inner liner terminates at the cylindrical locus bounding the downstream section 340 of inner casing 324.

Injector 328 includes an inner wall formed by the upstream portion of inner liner 326 and a concentric, cylindrical outer wall 343. The inner and outer walls are spanned by radially oriented, upstream and downstream end walls 344 and 346 and a similarly configured and oriented partition 348 spaced upstream from the latter.

Liquid fuel is supplied to combustor 320 from an external fuel line 350 through a valve 352, a manifold (not shown), and an annular array of branch fuel lines 354 (one shown). These may be configured and arranged in the same manner as the fuel delivery passage system 294, 296 of the injector 290 illustrated in FIGS. 10 and 11.

Atomizing air is supplied through one or more lines 356 which deliver the air to the annular injector plenum 358 between partition 348 and downstream end wall 346. This air is discharged at high velocity from plenum 358 through orifices 360 surrounding branch liquid fuel delivery lines 354.

Like those embodiments of my invention described previously, combustor 320 is designed to generate swirling or rotating annuli of stratified combustion and fuel atomizing air around a film of liquid fuel. The annular, combustion air passage of combustor 320 provided for this purpose is bounded by the outer wall 343 of injector 328 and the upstream section 334 of combustor outer casing 322 and is identified by reference character 362. Swirl vanes 364 of the character described above impart the wanted rotational component to the air flowing through this passage.

Operation of combustor 320 in the illustrated, stratified charge mode follows the pattern discussed above in conjunction with the combustors 20 of FIG. 1 and 196 of FIG. 7 except that the inner recirculation zone 366 is formed by (and confined between) the swirling annulus of burning gases 368 and inner liner 326 rather than by the construction and ultimate collapse of the annulus as in the previously described can configured combustors.

The outer recirculation zone 68 is formed in the same manner as, and duplicates that generated in, a can type CIVIC combustor.

As indicated above, secondary or dilution air can be supplied through annular passage 342 for the purposes discussed above in conjunction with the description of combustor 20. Delivery of the air in this manner has the added advantage that it cools those parts of the inner liner 326 contacted by the hot gases in inner recirculation zone 366, thereby protecting them against overheating.

Combustor 320 may be readily modified to provide a low emission mode of operation in addition to the illustrated stratified charge mode. All this requires is a modification to the injector, comparable to those discussed above, for generating an annulus of air in the region indicated by reference character 370 to shut off or isolate the hot gases in inner recirculation zones 366 and 319 from the swirling annulus of hot, evaporated fuel generated in flame stratification zone 54.

Combustor 320 also has dual fuel capability; that is, it can be operated on gas as well as liquid fuels. Gas fuels are supplied through a line 374 and a valve 376 to a second annular plenum 378 in injector 328 between its upstream end wall 344 and partition 348. The gas fuel is discharged from this plenum through an annular array of orifices 380 in outer injector wall 343 into the annular combustion air passage 362 as indicated by arrow 382.

Also, a system of the type illustrated in FIG. 5 can, with only minor and obvious modifications, be employed to switch the just discussed modification of combustor 320 between low emission and stratified charge modes of operation.

Many modifications may be made in the illustrated systems within what I consider the purview of my invention. For example, low emission and dual fuel capabilities can be provided on an across-the-board basis; and adjustable combustion air swirl vanes can be used to improve lean flame stability on a similar basis.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A method of effecting the stable, nonluminous combustion of a liquid fuel which comprises the steps of: generating an annulus of axially moving, rotating combustion air; forming a thin, uniform film of fuel on the inner boundary of said annulus at a specified location therealong; atomizing said fuel by contact between said fuel and said combustion air only after said film has been formed on the inner boundary of said annulus and so as to form a stratified annulus of small fuel droplets which resist centrifuging into the swirling annulus of combustion air; thereafter rapidly expanding said stratified annuli of combustion air and fuel droplets to promote the mixing and subsequent combustion of said fuel and air and then so effecting a downstream contraction of the swirling fuel-air mass as to effect the formation of a recirculation zone containing hot gases which stabilize the flame generated by the combustion of the fuel and air and so ignite the fuel as to effect evaporation and heating of the fuel before said stratified annuli of atomized fuel and rotating combustion air are rapidly expanded to promote the mixing of said fuel with the combustion air.

2. A method of effecting combustion as defined in claim 1 in which the atomization of the fuel is furthered by directing an independent stream of atomization assist air into contact with said film of fuel, said atomization assist air being directed into contact with said fuel only after the thin, stratified film of said fuel has been formed on the inner boundary of the rotating annulus of combustion air.

3. A method of effecting combustion as defined in claim 2 in which a rotational component opposing that of the rotating annulus of combustion air is so imparted to said fuel atomization assist air as to increase the resistance to centrifuging of the atomized fuel from the stratified annulus thereof into the rotating annulus of combustion air.

4. A method of effecting combustion as defined in claim 1 wherein annular rotation is imparted to said fuel prior to the forming of said film of fuel on the inner boundary of the annulus of combustion air.

5. A method of effecting combustion as defined in claim 1 which includes the step of so configuring the outer boundary of the annulus of combustion air that only a single recirculation zone surrounded by said flame is generated.

6. A method of effecting combustion as defined in claim 1 wherein the contraction of the fuel-air mass is effected in part by contact between the inner side of the swirling fuel-air mass and a component of the combustor in which the method is carried out.

7. A method of effecting combustion as defined in claim 1 wherein the formation of two inner recirculation zones having an upstream-downstream relationship is effected to promote the ignition of the fuel-air mixture.

8. A method of effecting combustion as defined in claim 1 in which the combustion air is, prior to combustion of the fuel, caused to flow in heat transfer relationship to at least one component of the combustor in which the method is carried out that is subject to overheating to thereby protect said component from overheating.

9. A method of effecting combustion as defined in claim 1 in which heated gases generated by combustion of the fuel are passed into heat transfer relationship with a component of the combustor in which the method is carried out that is subject to carbon build-up to burn off fuel that may have escaped through said annulus of combustion air to said component and thereby prevent carbon build-up.

10. A method of effecting combustion as defined in claim 1 wherein there is imparted to said fuel in at least one operating mode a rotation in the same direction as that of the rotating annulus of combustion air, thereby promoting the formation of said film of fuel.

11. A method of effecting the low emission combustion of a liquid fuel which comprises the steps of: generating an outer annulus of axially moving, rotating combustion air; forming a thin, uniform film of fuel on the inner boundary of said annulus at a specified location therealong; atomizing said fuel by contact between said fuel and said combustion air; centrifuging the atomized fuel outwardly into the annulus of combustion air to evaporate said fuel and mix it with the combustion air; and expanding the annulus of the fuel-air mixture thus formed and igniting said mixture and then effecting a downstream contraction of the fuel-air mass to promote the formation of a recirculation zone containing hot gases which stabilize the flame generated by the combustion of the fuel-air mixture and ignite the fuel-air mixture at a location downstream from the location at which premixing of the fuel with at least that air in the outer annulus is initiated, ignition of the fuel and air being delayed until atomization and evaporation of said fuel and the subsequent formation of the fuel-air mixture are completed by so generating an inner annulus of rotating air on the inner side of the annulus of fuel after said fuel has been atomized as to isolate the fuel from the hot gases in the recirculation zone and thereby prevent ignition of said fuel until the formation of the fuel-air mixture is completed as aforesaid.

12. A method of effecting combustion as defined in claim 11 in which the annulus of fuel-air mixture is so expanded as to generate a second, outer recirculation zone surrounding said premixed fuel and combustion air, said outer recirculation zone contacting the mixture thus formed at a location upstream from the location where said mixture is ignited by the hot gases in the first-mentioned recirculation zone, whereby the hot gases in the outer recirculation zone will ignite said fuel-air mixture at said upstream location and thereby reduce the length of the flame generated by the combustion of the fuel-air mixture.

13. A method of effecting combustion as defined in claim 11 in which the air in said inner annulus is caused to rotate in the same direction as the air in the outer annulus to promote the mixing of the fuel and combustion air and the evaporation of said fuel.

14. A method of effecting the combustion of fuel in a manner which provides a stable flame at off-design conditions and low emissions under operating conditions at or nearer the design point, said method including the steps of: effecting the combustion of said fuel at off-design conditions by: generating an annulus of axially moving, rotating combustion air; forming a thin, uniform film of fuel on the inner boundary of said annulus at a specified location therealong; atomizing said fuel by contact between said fuel and said combustion air and thereby forming a stratified annulus of small fuel droplets which resist centrifuging into the swirling annulus of combustion air; thereafter rapidly expanding said annuli to promote the mixing and subsequent combustion of said fuel and air and then effecting a downstream contraction of the swirling fuel-air mass to effect the formation of a recirculation zone containing hot gases which stabilize the flame generated by the combustion of the fuel and air and so ignite the fuel as to effect evaporation and heating of the fuel before it is mixed with the combustion air; combustion being effected at design and nearer design conditions by: generating an outer annulus of axially moving, rotating combustion air; forming a thin, uniform film of fuel on the inner boundary of said annulus at a specified location therealong; atomizing said fuel by contact between said fuel and said combustion air; generating on the inner side of the annulus of atomized fuel thus formed an inner annulus of rotating air to prevent the ignition of the fuel; centrifuging the atomized fuel outwardly into the annulus of combustion air to evaporate said fuel and mix it with the combustion air; and expanding the annulus of the fuel-air mixture thus formed and igniting said mixture and then effecting a downstream contraction of the fuel-air mass to promote the formation of a recirculation zone containing hot gases which stabilize the flame generated by the combustion of the fuel-air mixture and ignite the fuel-air mixture at a location downstream from the location at which premixing of the fuel with at least that air in the outer annulus is initiated.

15. A method of effecting the combustion of fuel in a manner which provides a stable flame at off-design conditions and low emissions under operating conditions at or nearer the design point, said method including the steps of: generating an annulus of axially moving, rotating combustion air; forming a thin, uniform film of fuel on the inner boundary of said annulus at a specified location therealong; atomizing said fuel by contact between said fuel and said combustion air and thereby forming a stratified annulus of small fuel droplets which resist centrifuging into the swirling annulus of combustion air; thereafter rapidly expanding said annuli to promote the mixing and subsequent combustion of said fuel and air and then effecting a downstream contraction of the swirling fuel-air mass to effect the formation of a recirculation zone containing hot gases which stabilize the flame generated by the combustion of the fuel and air and so ignite the fuel as to effect evaporation and heating of the fuel before it is mixed with the combustion air; combustion being effected at design and nearer design conditions by so injecting fuel into said annulus of combustion air as to premix said fuel and air and subsequently expanding said annulus and then effecting a downstream contraction of the fuel-air mass to promote the formation of a recirculation zone containing hot gases which stabilize the flame generated by the combustion of the fuel and air and ignite the fuel-combustion air mixture at a location downstream from the location at which premixing of the fuel with at least that air in said annulus is initiated.

16. A method of effecting the combustion of gaseous fuel which comprises the steps of: generating an annulus of axially moving, rotating combustion air; forming a thin, uniform film of said gaseous fuel on the inner boundary of said annulus at a specified location therealong; thereafter rapidly expanding said annuli to promote the mixing and subsequent combustion of said fuel and air and then effecting a downstream contraction of the swirling fuel-air mass to effect the formation of a recirculation zone containing hot gases which stabilize the flame generated by the combustion of the fuel and air and so ignite the fuel as to effect evaporation and heating of the fuel before it is mixed with the combustion air.

17. A method of effecting the combustion of fuel which comprises the steps of: generating an annulus of axially moving, rotating combustion air; injecting a gas or atomized or vaporized liquid fuel into said annulus at the upstream end thereof; thereafter rapidly expanding said annulus to promote the mixing and subsequent combustion of said fuel and air and then effecting a downstream contraction of the swirling fuel-air mass to effect the formation of a recirculation zone containing hot gases which stabilize the flame generated by the combustion of the fuel and air and so ignite the fuel as to effect evaporation and heating of the fuel before it is mixed with the combustion air.

18. A method of effecting combustion as defined in claim 17 in which the air in said annulus comprises the major portion of the air required for the complete combustion of said fuel.

19. A method of operating a gas turbine engine which is characterized in that the working fluid comprises hot gases generated by effecting the combustion of a gas or liquid fuel in accord with a method as defined in any of the preceding claims 1, 11, 14, 15 or 16.

20. A combustor comprising: an elongated, cylindrical casing having an upstream portion and a downstream portion; a fuel injector in the upstream portion of said casing; means for forming an annular combustion air passage in said upstream portion of said combustor; means for introducing combustion air into the upstream end of said passage and for effecting a flow of said air therethrough; means for imparting a rotational component to the air flowing through said passage, whereby said combustion air will be formed into and exit from said passage and the upstream portion of said casing in the form of a rotating, axially moving annulus; and fuel supply means for so providing an annulus of liquid fuel at or toward the downstream end of said injector that said fuel will be inhibited against mixing with said combustion air and will form into a thin, stratified film on the inner boundary of said combustion air annulus and subsequently be atomized by the air making up said annulus; the downstream portion of said casing being of sufficiently large diameter that said annuli of combustion air and atomized fuel can so expand thereinto as to reduce the centrifugal forces on, and promote the mixing and subsequent combustion of, said fuel and air and the formation of a recirculation zone containing hot gases which stabilize the flame generated by the combustion of the fuel and air and so ignite the fuel as to effect evaporation and heating of the fuel before it is mixed with the combustion air.

21. A combustor as defined in claim 20 wherein the fuel supply means is so constructed as to impart an annular rotation to the fuel being provided at said injector.

22. A combustor as defined in claim 20 wherein said injector comprises a hollow annular body with an open downstream end and wherein said fuel supply means comprises a plurality of passages in the injector, said passages opening onto the inner surface of said annular body at an acute angle thereto in a direction transverse to the longitudinal axis of the combustor to thereby impart a rotational component to the fuel exiting from said passages.

23. A combustor as defined in claim 22 in which said passages are oriented normally relative to the longitudinal axis of the combustor.

24. A combustor as defined in claim 22 wherein said passages are inclined toward the downstream end of the injector body.

25. A combustor as defined in claim 20 which has means providing an annular, longitudinally extending passage around said injector through which air can be pumped at high velocity to assit in atomizing fuel discharged from said fuel supply means.

26. A combustor as defined in claim 20 which has means for directing air independently of said combustion air at high velocity against said annulus of fuel to assist in atomizing said fuel, wherein the fuel supply means comprises a passage in said injector which extends to the downstream end of the injector, and wherein the means for directing the atomization assist air against the fuel comprises an atomizing air passage also extending through said injector to the downstream end thereof and means in said atomizing air passage for imparting a rotational component to air flowing therethrough.

27. A combustor as defined in claim 26 wherein the means in the atomizing air passage are such that the rotational component of the air flowing through said passage is opposite in direction to that imparted to the air flowing through said combustion air passage.

28. A combustor as defined in claim 26 together with means in said fuel supply means passage for imparting to the fuel flowing therethrough a rotational component which is in the same direction as that imparted to the air flowing through the atomizing air passage.

29. A combustor as defined in claim 20 wherein said casing has a transition portion between said upstream and downstream portions thereof that is so configured as to be wiped by the expanding, rotating annulus of combustion air to thereby protect said combustor against overheating.

30. A combustor as defined in claim 20 which includes means for forming between said annulus of fuel and said recirculation zone an inner, rotating annulus of air which is effective to insulate the fuel from the hot gases in said zone and delay the ignition of said fuel, thereby allowing said fuel to be centrifuged outwardly into the annulus of combustion air and to be evaporated and mixed with said air and subsequently ignited to provide a low emission mode of operation.

31. A combustor as defined in claim 30 together with means for blocking the flow of air to said second air annulus forming means and thereby increasing the range of efficient operation of the combustor and for making air available thereto to thereby drive the combustor into the low emission mode of operation.

32. A combustor as defined in claim 20 wherein said elongated cylindrical casing has an outer wall, an inner wall, and a dome extending between said walls at the upstream end thereof and wherein the means for introducing combustion air into the upstram end of said combustion air passage and for effecting a flow of said air therethrough includes means cooperating with said inner and outer walls and said dome to form an axially extending combustion air passage and a radially directed, annular passage communicating at the inner end thereof with said axially extending combustion air passage, whereby said combustion air will be formed into and exit from said axially extending combustion air passage and the upstream portion of said casing in the form of a rotating, axially moving annulus as aforesaid and said dome will be protected against overheating by the combustion air flowing into said combustor through said radially directed combustion air passage.

33. A combustor as defined in claim 20 which includes means for so introducing dilution air into said downstream casing portion as to complete the combustion of said fuel-air mixture without penetration of said air into the hot gas containing recirculation zone.

34. A combustor as defined in claim 20 wherein said fuel supply means comprises a passage in said injector that is annularly configured, concentric with the longitudinal axis of the injector and inclined toward the downstream end thereof, and opens onto the outer surface of said injector ahead of its downstream end.

35. A combustor as defined in claim 20 which also includes an elongated inner casing disposed concentrically within the casing having the upstream and downstream portions to form said annular combustion air passage, wherein the means for imparting a rotational component to combustion air imparts said rotation to the air flowing through the aforesaid passage, whereby said combustion air will be formed into and exit from said passage and the upstream portion of the outer casing in the form of said rotating, axially moving annulus, and wherein the fuel supply means surrounds said inner casing and lies between it and said outer casing.

36. A combustor as defined in claim 35 which includes means disposed within said inner casing and concentric therewith through which air can flow to cool said inner casing and to provide secondary air for the combustion of said fuel.

37. A gas turbine engine comprising a turbine through which hot gases can be expanded to convert thermal to mechanical energy, a compressor driven by said turbine, and a combustor as defined in either of claims 20 or 36 communicating at the downstream end thereof with said turbine for heating said compressor air for subsequent expansion through said turbine.

38. A gas turbine engine comprising: a combustor which includes: an elongated cylindrical casing having an upstream portion and a downstream portion; a fuel injector in the upstream portion of said casing; means forming an annular combustion air passage in said upstream portion of said casing; means for imparting a rotational component to the air flowing through said passage, whereby said combustion air will be formed into and exit from said passage and the upstream portion of said casing in the form of a rotating, axially moving annulus; and fuel supply means for so providing an annulus of liquid fuel at or toward the downstream end of said injector that said fuel will be inhibited against mixing with said combustion air and will form into a thin, stratified film on the inner boundary of said combustion air annulus and subsequently be atomized by the air making up said annulus; the downstream portion of said casing being configured such that said annuli of combustion air and fuel can so expand thereinto as to reduce the centrifugal forces on, and promote the mixing and subsequent combustion of, said fuel and air and the formation of a recirculation zone containing hot gases which stabilize the flame generated by the combustion of the fuel and air and so ignite the fuel as to effect evaporation and heating of the fuel before it is mixed with the combustion air; a compressor; means including said compressor for introducing combustion air into the upstream end of the combustion air passage and for effecting a flow of said air therethrough; and a turbine through which the hot gases generated in said combustor can be expanded to produce mechanical energy.

39. A gas turbine engine as defined in claim 38 which comprises means providing fluid communication between the discharge side of said compressor and the interior of the combustor casing through which dilution air can be introduced into the combustor and without penetrating into said recirculation zone to complete the combustion of said fuel-air mixture and/or to cool the combustion products and/or the combustor.

40. A gas turbine engine as defined in claim 38 in which said combustor has an axisymmetric annular configuration.

41. A gas turbine engine as defined in claim 38 which includes means for introducing a gaseous fuel into said combustor, whereby said gas turbine engine can be operated on said gaseous fuel, and means which is selectively activatable to supply either a liquid fuel or a gaseous fuel as aforementioned to said combustor.

42. A method of effecting the stable, non-luminous combustion of a liquid fuel which comprises the steps of: generating an annulus of axially moving, rotating combustion air; forming a thin, uniform film of fuel on the inner boundary of said annulus at a specified location therealong; atomizing said fuel by contact between said fuel and said combustion air and thereby forming a stratified annulus of small fuel droplets which resist centrifuging into the swirling annulus of combustion air; thereafter rapidly expanding said annuli to promote the mixing and subsequent combustion of said fuel and air and then effecting a downstream contraction of the swirling fuel-air mass to effect the formation of a recirculation zone containing hot gases which stabilize the flame generated by the combustion of the fuel and air and so ignite the fuel as to effect evaporation and heating of the fuel before it is mixed with the combustion air, the air in said annulus being rotated at a velocity which is sufficiently high that the resulting centrifugal forces will keep the hot evaporated fuel in the annulus thereof formed on the inner boundary of the combustion air annulus by evaporation of the fuel as aforesaid from moving radially outward into the combustion air annulus.

43. A method of effecting the stable, non-luminous combustion of a liquid fuel which comprises the steps of: generating an annulus of axially moving, rotating combustion air which contains not less than the stoichiometric amount of air needed for combustion of the fuel or air in excess of that amount; forming a thin, uniform film of fuel on the inner boundary of said annulus at a specified location therealong; atomizing said fuel by contact between said fuel and said combustion air and thereby forming a stratified annulus of small fuel droplets which resist centrifuging into the swirling annulus of combustion air; thereafter rapidly expanding said annuli to promote the mixing and subsequent combustion of said fuel and air and then effecting a downstream contraction of the swirling fuel-air mass to effect the formation of a recircualtion zone containing hot gases which stabilize the flame generated by the combustion of the fuel and air and so ignite the fuel as to effect evaporation and heating of the fuel before it is mixed with the combustion air.

44. A method of effecting the stable, non-luminous combustion of a liquid fuel which comprises the steps of: generating an annulus of axially moving, rotating combustion air; forming a thin, uniform film of fuel on the inner boundary of said annulus at a specified location therealong; atomizing said fuel by contact between said fuel and said combustion air and thereby forming a stratified annulus of small fuel droplets which resist centrifuging into the swirling annulus of combustion air; and thereafter rapidly expanding said annuli to promote the mixing and subsequent combustion of said fuel and air and then effecting a downstream contraction of the swirling fuel-air mass to effect the formation of a recirculation zone containing hot gases which stabilize the flame generated by the combustion of the fuel and air and so ignite the fuel as to effect evaporation and heating of the fuel before it is mixed with the combustion air, the amount of air present in said annulus of combustion air being less than the stoichiometric amount for combustion of the fuel, thereby maximizing the range of operation of the combustor in which the method is carried out and/or minimizing the conversion of fuel-bound nitrogen in the fuel being burned to $NO_x$ and said method also including the step of introducing additional air into the combustor in which the method is carried out to complete the combustion of said fuel, said air being added in a manner which is effective to keep it from penetrating to said recirculation zone.

45. A method of effecting the stable, non-luminous combustion of a liquid fuel which comprises the steps of: generating an annulus of axially moving, rotating combustion air; forming a thin, uniform film of fuel on the inner boundary of said annulus at a specified location therealong; atomizing said fuel by contact between said fuel and said combustion air and thereby forming a stratified annulus of small fuel droplets which resist centrifuging into the swirling annulus of combustion air; thereafter rapidly expanding said annuli to promote the mixing and subsequent combustion of said fuel and air and the formation of a swirling annulus of burning gases and then effecting a downstream contraction of the swirling annulus of burning gases to effect the formation of a recirculation zone containing hot gases which stabilize the flame generated by the combustion of the fuel and air and so ignite the fuel as to effect evaporation and heating of the fuel before it is mixed with the combustion air, the annulus of burning gases being so expanded in promoting the mixing of said air and fuel as to generate an inner recirculation zone surrounded by said flame and an outer recirculation zone surrounding the annulus of combustion air and extending downstream from the location at which the expansion of said stratified annuli of combustion air and fuel is initiated.

46. A method of effecting the stable, non-luminous combustion of a liquid fuel which comprises the steps of: generating an annulus of axially moving, rotating combustion air; forming a thin, uniform film of fuel on the inner boundary of said annulus at a specified location therealong; atomizing said fuel by contact between said fuel and said combustion air and thereby forming a stratified annulus of small fuel droplets which resist centrifuging into the swirling annulus of combustion air; thereafter rapidly expanding said annuli to promote the mixing and subsequent combustion of said fuel and air and then effecting a downstream contraction of the swirling fuel-air to effect the formation of a recirculation zone containing hot gases which stabilize the flame generated by the combustion of the fuel and air and so ignite the fuel as to effect evaporation and heating of the fuel before it is mixed with the combustion air; and, during light-off, directing an air pump-generated, high velocity stream of air into contact with said fuel film to promote the atomization of said fuel.

47. A method of effecting the low emission combustion of a liquid fuel which comprises the steps of: generating an outer annulus of axially moving, rotating combustion air; forming a thin, uniform film of fuel on the inner boundary of said annulus at a specified location therealong; atomizing said fuel by contact between said fuel and said combustion air; generating on the inner side of the annulus of atomized fuel thus formed an inner annulus of rotating air to prevent the ignition of the fuel; centrifuging the atomized fuel outwardly into the annulus of combustion air to evaporate said fuel and mix it with the combustion air; expanding the annulus of the fuel-air mixture thus formed, igniting said mixture, and then effecting a downstream contraction of the fuel-air mass to promote the formation of a recirculation zone containing hot gases which stabilize the flame generated by the combustion of the fuel-air mixture and ignite the fuel-air mixture at a location downstream from the location at which premixing of the fuel with at least that air in the outer annulus is initiated; and, during light-off, directing an air pump-generated, high velocity stream of air into contact with said fuel film to promote the atomization of said fuel.

48. A method of effecting the combustion of fuel in a manner which provides a stable flame at off-design conditions and low emissions under operating conditions at or nearer the design point, said method including the steps of: effecting the combustion of said fuel at off-design conditions by: generating an annulus of axially moving, rotating combustion air; forming a thin, uniform film of fuel on the inner boundary of said annulus at a specified location therealong; atomizing said fuel by contact between said fuel and said combustion air and thereby forming a stratified annulus of small fuel droplets which resist centrifuging into the swirling annulus of combustion air; thereafter rapidly expanding said annuli to promote the mixing and subsequent combustion of said fuel and air and then effecting a downstream contration of the swirling fuel-air mass to effect the formation of a recirculation zone containing hot gases which stabilize the flame generated by the combustion of the fuel and air and so ignite the fuel as to effect evaporation and heating of the fuel before it is mixed with the combustion air; combustion being effected at design and nearer design conditions by: generating an outer annulus of axially moving, rotating combustion air; forming a thin, uniform film of fuel on the inner boundary of said annulus at a specified location therealong; atomizing said fuel by contact between said fuel and said combustion air; generating on the inner side of the annulus of atomized fuel thus formed on inner annulus of rotating air to prevent the ignition of the fuel; centrifuging the atomized fuel outwardly into the annulus of combustion air to evaporate said fuel and mix it with the combustion air; and expanding the annulus of the fuel-mixture thus formed, igniting said mixture, and then effecting a downstream contraction of the fuel-air mass to promote the formation of a recirculation zone containing hot gases which stabilize the flame generated by the combustion of the fuel-air mixture and ignite the fuel-air mixture at a location downstream from the location at which premixing of the fuel with at least that air in the outer annulus is initiated; and, during light-off, directing an air pump-generated, high velocity stream of air into contact with said fuel film to promote the atomization of said fuel.

49. A method of effecting the combustion of fuel in a manner which provides a stable flame at off-design conditions and low emissions under operating conditions at or nearer the design point, said method including the steps of: generating an annulus of axially moving, rotating combustion air; forming a thin, uniform film of fuel on the inner boundary of said annulus at a specified location therealong; atomizing said fuel by contact between said fuel and said combustion air and thereby forming a stratified annulus of small fuel droplets which resist centrifuging into the swirling annulus of combustion air; thereafter rapidly expanding said annuli to promote the mixing and subsequent combustion of said fuel and air and then effecting a downstream contraction of the swirling fuel-air mass to effect the formation of a recirculation zone containing hot gases which stabilize the flame generated by the combustion of the fuel and air and so ignite the fuel as to effect evaporation and heating of the fuel before it is mixed with the combustion air; combustion being effected at design and nearer design conditions by so injecting fuel into said annulus of combustion air as to premix said fuel and air, subsequently expanding said annulus, and then effecting a downstream contraction of the fuel-air mass to promote the formation of a recirculation zone containing hot gases which stabilize the flame generated by the combustion of the fuel and air and ignite the fuel-combustion air mixture at a location downstream from the location at which premixing of the fuel with at least that air in said annulus is initiated; and, during light-off, directing an air pump-generated, high velocity stream of air into contact with said fuel film to promote the atomization of said fuel.

50. A gas turbine engine comprising: a combustor which includes: an elongated cylindrical casing having an upstream portion and a downstream portion; a fuel injector in the upstream portion of said casing; means forming an annular combustion air passage in said upstream portion of said casing; means for imparting a rotational component to the air flowing through said passage, whereby said combustion air will be formed into and exit from said passage and the upstream portion of said casing in the form of a rotating, axially moving annulus; and fuel supply means for so providing an annulus of liquid fuel at or toward the downstream end of said injector that said fuel will form into a thin, stratified film on the inner boundary of said combustion air annulus and be atomized by the air making up said annulus, the downstream portion of said casing being configured such that said annuli of combustion air and fuel can so expand thereinto as to reduce the centrifugal forces on, and promote the mixing and subsequent combustion of, said fuel and air and the formation of a recirculation zone containing hot gases which stabilize the flame generated by the combustion of the fuel and air and so ignite the fuel as to effect evaporation and heating of the fuel before it is mixed with the combustion air; a compressor; means including said compressor for introducing combustion air into the upstream end of the combustion air passage and for effecting a flow of said air therethrough; a turbine through which the hot gases generated in said combustor can be expanded to produce mechanical energy; and a pump operable independently of said compressor for supplying air to said combustor.

51. A gas turbine engine as defined in claim 50 in which said combustor has means through which said air can be pumped at high velocity to assist in atomizing fuel discharged from said fuel supply means.

52. A gas turbine engine comprising: a combustor which includes: an elongated cylindrical casing having an upstream portion and a downstream portion; a fuel injector in the upstream portion of said casing; means forming an annular combustion air passage in said upstream portion of said casing; means for imparting a rotational component to the air flowing through said passage, whereby said combustion air will be formed into and exit from said passage and the upstream portion of said casing in the form of a rotating, axially moving annulus; and fuel supply means for so providing an annulus of liquid fuel at or toward the downstream end of said injector that said fuel will form into a thin, stratified film on the inner boundary of said combustion air annulus and be atomized by the air making up said annulus, the downstream portion of said casing being configured such that said annuli of combustion air and fuel can so expand thereinto as to reduce the centrifugal forces on, and promote the mixing and subsequent combustion of, said fuel and air and the formation of a recirculation zone containing hot gases which stabilize the flame generated by the combustion of the fuel and air and so ignite the fuel as to effect evaporation and heating of the fuel before it is mixed with the combustion air; a compressor; means including said compressor for introducing combustion air into the upstream end of the combustion air passage and for effecting a flow of said air therethrough; and a turbine through which the hot gases generated in said combustor can be expanded to produce mechanical energy, said combustor having means for forming between said annulus of fuel and said recirculation zone an inner, rotating annulus of air which is effective to insulate the fuel from the hot gases in said zone and delay the ignition of said fuel, thereby allowing said fuel to be centrifuged outwardly into the annulus of combustion air and to be evaporated and mixed with said air and subsequently ignited, thereby providing a low emission mode of operation, and said engine further including means which are selectively activatable to block the flow of air to said second air annulus forming means and thereby increase the range of efficient operation of the combustor and to make air available thereto to thereby drive the combustor into the low emission mode of operation.

53. A method of effecting the stable, non-luminous combustion of a liquid fuel which comprises the steps of: generating a first annulus of axially moving, rotating combustion air; forming a thin, uniform film of fuel on the inner boundary of said annulus at a specified location therealong; atomizing said fuel by contact between said fuel and said combustion air and thereby forming a stratified annulus of small fuel droplets; inhibiting the centrifuging of said fuel into said first rotating annulus of combustion air by sandwiching the annulus of fuel between the latter and a second, inner, axially moving, rotating annulus of air which contains only a fraction of the amount of air contained in said first annulus; thereafter rapidly expanding said annuli of air and fuel to promote the mixing and subsequent combustion of said fuel and air and then effecting a downstream contraction of the swirling fuel-air mass to effect the formation of a recirculation zone containing hot gases which stabilize the flame generated by the combustion of the fuel and air and so ignite the fuel as to effect evaporation and heating of the fuel before it is mixed with the combustion air.

* * * * *

UNITED STATES PATENT AND TRADEMARK OFFICE
CERTIFICATE OF CORRECTION

PATENT NO. : 4,373,325
DATED : February 15, 1983
INVENTOR(S) : JACK R. SHEKLETON It is certified that error appears in the above-identified patent and that said Letters Patent is hereby corrected as shown below:

On the Title Page please change the name of Assignee from "International Harvester Company, Chicago, Ill."

to read as follows:

--Solar Turbines Incorporated, San Diego, Calif.--

Signed and Sealed this

Ninth Day of August 1983

[SEAL]

*Attest:*

*Attesting Officer*

GERALD J. MOSSINGHOFF

*Commissioner of Patents and Trademarks*